United States Patent
Buscaglia et al.

(10) Patent No.: US 11,599,677 B2
(45) Date of Patent: Mar. 7, 2023

(54) SYNCHRONIZING ORGANIZATIONAL DATA ACROSS A PLURALITY OF THIRD-PARTY APPLICATIONS

(71) Applicant: People Center, Inc., San Francisco, CA (US)

(72) Inventors: Daniel Robert Buscaglia, San Francisco, CA (US); Dilanka Theshan Dharmasena, Silver Spring, MD (US); Kyle Michael Boston, San Carlos, CA (US)

(73) Assignee: PEOPLE CENTER, INC., San Francisco, CA (US)

( * ) Notice: Subject to any disclaimer, the term of this patent is extended or adjusted under 35 U.S.C. 154(b) by 0 days.

(21) Appl. No.: 17/245,880

(22) Filed: Apr. 30, 2021

(65) Prior Publication Data
US 2022/0350902 A1 Nov. 3, 2022

(51) Int. Cl.
*G06F 21/62* (2013.01)
*G06F 16/242* (2019.01)
(Continued)

(52) U.S. Cl.
CPC .......... *G06F 21/629* (2013.01); *G06F 16/213* (2019.01); *G06F 16/2448* (2019.01);
(Continued)

(58) Field of Classification Search
CPC ............... G06F 21/629; G06F 16/2448; G06F 16/24573; G06F 16/213; G06F 2221/2137;
(Continued)

(56) References Cited

U.S. PATENT DOCUMENTS 6,233,617 B1 * 5/2001 Rothwein ........... H04L 63/0428
709/227
6,377,957 B1 * 4/2002 Jeyaraman ............ G06F 16/282
707/625
(Continued)

OTHER PUBLICATIONS

Oracle Identity and Access Management—Introduction Oracle, 2006 (Year: 2006).*
(Continued)

*Primary Examiner* — Scott L Jarrett
(74) *Attorney, Agent, or Firm* — Dority & Manning, P.A.

(57) ABSTRACT

Methods, systems, devices, and tangible non-transitory computer readable media for configuring and implementing application policies are provided. The disclosed technology can access application policy data associated with implementing an application policy. The application policy data can include rules associated with implementing the application policy by using organizational data associated with a plurality of applications that includes a set of extra-organizational applications that perform operations associated with a different set of extra-organizational applications. Based on the application policy data, organizational records of the organizational data that satisfy the one or more rules can be determined. The plurality of applications associated with the one or more organizational records that satisfy the one or more rules can then be accessed. Furthermore, based at least in part on the application policy and the one or more organizational records, the one or more operations associated with implementing the application policy can be performed.

24 Claims, 10 Drawing Sheets

(51) Int. Cl.
*G06F 16/2457* (2019.01)
*G06F 16/21* (2019.01)
*G06Q 10/105* (2023.01)
*G06Q 10/0631* (2023.01)
*G06Q 10/10* (2023.01)

(52) U.S. Cl.
CPC ............... *G06F 16/24573* (2019.01); *G06Q 10/063114* (2013.01); *G06Q 10/10* (2013.01); *G06F 2221/2137* (2013.01); *G06Q 10/105* (2013.01)

(58) Field of Classification Search
CPC ...... G06F 16/27; G06F 21/41; G06F 16/2358; G06F 16/23; G06F 16/178; H04L 29/06; H04L 63/0815; G06Q 10/105
USPC ............................................................ 726/27
See application file for complete search history.

(56) References Cited

U.S. PATENT DOCUMENTS

| | | | | |
|---|---|---|---|---|
| 8,019,737 | B2* | 9/2011 | Kocsis | G06F 16/213 707/694 |
| 8,082,337 | B1* | 12/2011 | Davis | H04L 41/0893 726/1 |
| 9,454,576 | B1* | 9/2016 | Kapoor | G06Q 10/105 |
| 9,602,540 | B1* | 3/2017 | Johansson | H04L 63/08 |
| 9,860,280 | B1* | 1/2018 | Arquero | H04L 63/104 |
| 10,257,184 | B1* | 4/2019 | Mehta | H04L 63/083 |
| 10,298,678 | B2* | 5/2019 | Castro | H04L 67/025 |
| 10,776,384 | B1* | 9/2020 | Jackson | G06F 16/27 |
| 11,206,262 | B2* | 12/2021 | Gargaro | H04L 63/20 |
| 2002/0165960 | A1* | 11/2002 | Chan | G06F 21/604 709/225 |
| 2003/0033167 | A1* | 2/2003 | Arroyo | G06Q 10/103 705/7.42 |
| 2003/0033528 | A1* | 2/2003 | Ozog | G06F 21/33 713/170 |
| 2005/0228812 | A1* | 10/2005 | Hansmann | G06F 16/258 707/999.102 |
| 2006/0080116 | A1* | 4/2006 | Maguire | G06Q 10/10 705/320 |
| 2006/0206506 | A1* | 9/2006 | Fitzpatrick | G06Q 20/20 |
| 2006/0282291 | A1* | 12/2006 | Runciman | G16H 50/70 705/3 |
| 2008/0021759 | A1* | 1/2008 | Wasley | G06Q 10/063114 705/7.15 |
| 2008/0059804 | A1* | 3/2008 | Shah | H04L 63/0884 726/8 |
| 2008/0072301 | A1* | 3/2008 | Chia | H04L 63/0815 726/8 |
| 2008/0086473 | A1* | 4/2008 | Searl | G06F 21/604 707/999.009 |
| 2008/0168063 | A1* | 7/2008 | Whitson | G06F 21/604 707/E17.031 |
| 2009/0070391 | A1* | 3/2009 | Blair | G06F 16/25 707/999.203 |
| 2009/0249440 | A1* | 10/2009 | Platt | H04L 63/0815 726/1 |
| 2010/0229149 | A1* | 9/2010 | Gella | G06F 8/24 717/101 |
| 2012/0116980 | A1* | 5/2012 | Mercuri | G06Q 10/103 705/301 |
| 2013/0111562 | A1* | 5/2013 | Lee | G06F 21/6218 726/4 |
| 2013/0191338 | A1* | 7/2013 | Ducott, III | G06F 21/6218 707/634 |
| 2014/0075492 | A1* | 3/2014 | Kapadia | G06F 21/604 726/1 |
| 2014/0173699 | A1* | 6/2014 | Daly | H04L 63/104 726/4 |
| 2014/0258826 | A1* | 9/2014 | Barrus | G06Q 10/0633 715/224 |
| 2014/0278629 | A1* | 9/2014 | Stephenson | G06Q 10/1091 705/7.13 |
| 2015/0058931 | A1* | 2/2015 | Miu | G06Q 20/02 707/784 |
| 2015/0058950 | A1* | 2/2015 | Miu | G06Q 20/384 726/7 |
| 2015/0059003 | A1* | 2/2015 | Bouse | G06F 21/32 726/28 |
| 2015/0095999 | A1* | 4/2015 | Toth | H04L 9/3263 726/6 |
| 2016/0306864 | A1* | 10/2016 | Estes, Jr. | G06F 16/27 |
| 2017/0118220 | A1* | 4/2017 | Barbara | G06F 21/604 |
| 2018/0232404 | A1 | 8/2018 | Bhatti | |
| 2018/0337907 | A1* | 11/2018 | Bhansali | G06F 21/32 |
| 2019/0327271 | A1* | 10/2019 | Saxena | H04L 41/16 |
| 2020/0242605 | A1* | 7/2020 | Shah | G06Q 20/4015 |
| 2020/0396222 | A1* | 12/2020 | Gargaro | H04L 63/20 |
| 2021/0141913 | A1* | 5/2021 | Mosconi | G06F 21/121 |
| 2021/0226812 | A1* | 7/2021 | Park | G06F 16/9024 |
| 2021/0264372 | A1* | 8/2021 | Asseer | G06Q 10/1053 |
| 2021/0390170 | A1* | 12/2021 | Olden | G06F 21/604 |
| 2021/0392048 | A1* | 12/2021 | Olden | H04L 67/28 |
| 2021/0392132 | A1* | 12/2021 | Olden | H04L 67/1095 |

OTHER PUBLICATIONS

Oracle Identity Management 11g—An Oracle White Paper Oracle, Jul. 2010 (Year: 2010).*
Conrad, Parker, Announcing Rippling: The First Employee Management System Rippling.com, Oct. 13, 2018 (Year: 2018).*
Rippling.com Home Page People Center, Inc., Oct. 11, 2018, Retrieved from Archive.org Apr. 27, 2022 (Year: 2018).*
Rippling.com Home Page People Center, Inc., May 28, 2019, Retrieved from Archive.org Apr. 27, 2022 (Year: 2019).*
Rippling.com Home Page People Center, Inc., Jan. 4, 2020, Retrieved from Archive.org Apr. 27, 2022 (Year: 2020).*
Oracle Human Resources Management Systems—Workforce Sourcing, Deployment and Talent Management Guide Oracle, Release 12.2, Sep. 2013 (Year: 2013).*
Rippling Blog, "Introducing the Future of Workforce Management: Rippling Unity", Nov. 11, 2021, https://www.rippling.com/blog/introducing-rippling-unity, retrieved on Jul. 27, 2022, 21 pages.
International Search Report and Written Opinion for Application No. PCT/US2022/026499, dated Jul. 22, 2022, 14 pages.

* cited by examiner

SYNCHRONIZING ORGANIZATIONAL DATA ACROSS A PLURALITY OF THIRD-PARTY APPLICATIONS

FIELD

The present disclosure relates generally to configuring and implementing computing applications and computing systems. More particularly, the present disclosure relates to configuring and implementing application policies associated with extra-organizational applications.

BACKGROUND

Computing systems can be used as platforms on which various devices and/or applications, including software applications, can be accessed and used by users. The applications may include third-party applications that may generate and communicate information associated with an organization. To provide an example, an organization may use a first third-party application for time entry and management, a second third-party application for textual or audiovisual communication among employees, a third third-party application for information technology management, a fourth third-party application for accounting, a fifth third-party application for workflow management, and so on. Specifically, modem organizations may employ, have employees engaged in, and/or retain data across dozens of different third-party applications.

However, many third-party applications are not in communication with one another and as a result certain information that it would be beneficial to share is isolated within the confines of each individual application. Further, the third-party applications may have access controls that may prevent the respective applications from being accessed by other applications. This can result in lost efficiency as data must be manually transferred among different applications or data may remain outdated or incorrect in various applications. Having outdated or incorrect data in applications can result in wasted computational resources if certain work in applications ends up being discarded or re-worked when new data is available.

As such, improving the effectiveness and ease with which data across different third-party applications can be synthesized may result in an improvement in the overall effectiveness of computing system operations across an organization. Accordingly, there exists a demand for a more effective way of configuring and implementing application policies that can increase communication between different third-party applications.

SUMMARY

Aspects and advantages of embodiments of the present disclosure will be set forth in part in the following description, or can be learned from the description, or can be learned through practice of the embodiments.

One example aspect of the present disclosure is directed to a computing system configured to automatically cause actions in linked third-party applications based on data collected from other third-party applications. The computing system includes one or more processors and one or more non-transitory computer-readable media that store: a set of organizational data associated with an organization, wherein the set of organizational data comprises a plurality of employee data objects that respectively correspond to a plurality of employees of the organization; and one or more sets of computer-readable instructions that, when executed by the one or more processors, cause the computing system to perform operations to implement an organizational management platform in communication with a plurality of third-party applications. The operations include receiving first application data from a first third-party application of the plurality of third-party applications, wherein the first application data is descriptive of an action performed in the first third-party application. The operations include accessing an application policy associated with a second third-party application of the plurality of third-party applications, the second third-party application being different and distinct from the first third-party application. The operations include evaluating the application policy data associated with a second third-party application based at least in part on the first application data received from the first third-party application and based at least in part on the set of organizational data to determine one or more operations associated with implementing the application policy. The one or more operations associated with implementing the application policy can include causing an action to be performed in the second third-party application. The operations include communicating with the second third-party application to cause the action to be performed in the second third-party application by the second third-party application.

Another example aspect of the present disclosure is directed to a computer-implemented method of configuring and implementing application policies. The computer-implemented method can include accessing, by a computing system including one or more processors, application policy data associated with implementing an application policy. The application policy data can include one or more rules associated with implementing the application policy by using organizational data associated with a plurality of applications that includes a set of one or more extra-organizational applications that perform one or more operations associated with a different set of one or more extra-organizational applications. The computer-implemented method can include determining, by the computing system, based at least in part on the application policy data, one or more organizational records of the organizational data that satisfy the one or more rules. The computer-implemented method can include accessing, by the computing system, the plurality of applications associated with the one or more organizational records that satisfy the one or more rules. Furthermore, the computer-implemented method can include performing, by the computing system, based at least in part on the application policy and the one or more organizational records, the one or more operations associated with implementing the application policy.

Another example aspect of the present disclosure is directed to one or more tangible non-transitory computer-readable media storing computer-readable instructions that when executed by one or more processors cause the one or more processors to perform operations. The operations can include accessing, by a computing system including one or more processors, application policy data associated with implementing an application policy. The application policy data can include one or more rules associated with implementing the application policy by using organizational data associated with a plurality of applications that includes a set of one or more extra-organizational applications that perform one or more operations associated with a different set of one or more extra-organizational applications. The operations can include determining, by the computing system, based at least in part on the application policy data, one or more organizational records of the organizational data that satisfy the one or more rules. The operations can include accessing, by the computing system, the plurality of applications associated with the one or more organizational records that satisfy the one or more rules. Furthermore, the operations can include performing, by the computing system, based at least in part on the application policy and the one or more organizational records, the one or more operations associated with implementing the application policy.

Another example aspect of the present disclosure is directed to a computing system that includes: one or more processors; one or more non-transitory computer-readable media storing instructions that when executed by the one or more processors cause the one or more processors to perform operations. The operations can include accessing, by a computing system including one or more processors, application policy data associated with implementing an application policy. The application policy data can include one or more rules associated with implementing the application policy by using organizational data associated with a plurality of applications that includes a set of one or more extra-organizational applications that perform one or more operations associated with a different set of one or more extra-organizational applications. The operations can include determining, by the computing system, based at least in part on the application policy data, one or more organizational records of the organizational data that satisfy the one or more rules. The operations can include accessing, by the computing system, the plurality of applications associated with the one or more organizational records that satisfy the one or more rules. Furthermore, the operations can include performing, by the computing system, based at least in part on the application policy and the one or more organizational records, the one or more operations associated with implementing the application policy.

Other aspects of the present disclosure are directed to various systems, apparatuses, non-transitory computer-readable media, user interfaces, and devices for the configuration and implementation of application policies.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
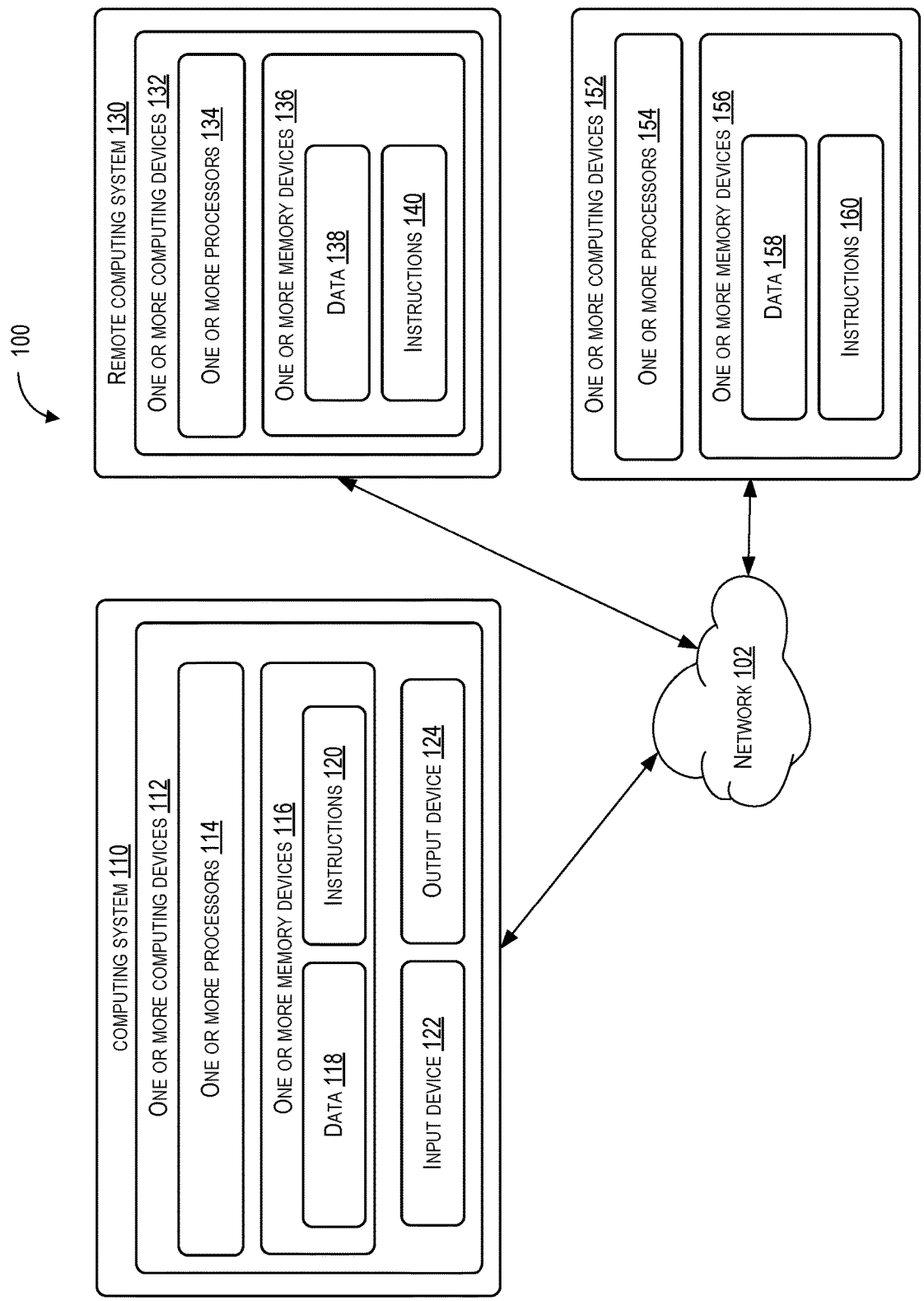
FIG. 1 depicts a block diagram of an example environment including a computing system that performs operations according to example embodiments of the present disclosure.

Reference numerals that are repeated across plural figures are intended to identify the same features in various implementations.

DETAILED DESCRIPTION

The present disclosure is generally directed to the generation, configuration, and implementation of application policies. In particular, example aspects of the present disclosure are directed to a computing system that can be used to configure or implement application policies that can be used to regulate the access, operation, and control of extra-organizational applications (e.g., third-party applications). Further, the computing systems described herein can provide specific benefits to the creation, configuration, and implementation of application policies for an organization that manages, leverages, or works within extra-organizational applications and related computing devices, intra-organizational applications, and organizational data. For example, the disclosed technology can be used to access organizational data associated with a first application and perform operations associated with a second, different application that does not directly communicate with the first application. Further, the disclosed technology can be used to facilitate the creation of a customized application policy that does not violate existing organizational policies. Further, the customized application policies can provide administrators or managers of the application policy with a user friendly way of implementing application policies for particular applications that may be used by various groups of users. Additionally, the disclosed technology can be used to trigger the performance of operations in an application based on organizational data obtained from a different application and/or organizational data that has been modified or updated based on data obtained from a different application. In this way, an administrator or other user of the disclosed technology can implement application policies that streamline the management of extra-organizational applications that might otherwise require burdensome manual intervention.

More particularly, one example aspect of the present disclosure is directed to a computing system configured to automatically cause actions in linked third-party applications based on data collected from other, different third-party applications. Specifically, the computing system can include and implement an organizational management platform. The organizational management platform can have access to and/or control over a set of organizational data associated with an organization. For example, the organizational data may include employee-related data such as a plurality of employee data objects that respectively correspond to a plurality of employees of the organization).

The organizational management platform can be in communication with a plurality of third-party applications that are used by the organization. For example, the organizational management platform may be able to push and/or pull data from the applications. As such, the applications may be referred to as "linked applications". As examples, data can be pushed to or pulled from third-party applications via application programming interface(s), flat files, data hooks or calls, and/or other data sharing mechanisms. The movement of data between the organizational management platform and various third-party applications can be fully automatic or can involve some human intervention.

The third-party applications can be any form of application which is used by or associated with the organization. To provide an example, an organization may use a first third-party application for time entry and management, a second third-party application for textual or audiovisual communication among employees, a third application for information technology management, a fourth application for accounting, a fifth application for workflow management, and so on.

According to an aspect of the present disclosure, the organizational management platform can automatically cause actions in linked third-party applications based on data collected from other, different third-party applications. Specifically, in one example, the organizational management platform can receive first application data from a first third-party application of the plurality of third-party applications. The first application data can be descriptive of an action performed in the first third-party application. For example, the action can be a user-performed action performed by a user in the first third-party application or the action can be an application-performed action performed by the first third-party application. As one example, the action can describe an update to data stored in or otherwise associated with the first third-party application.

The organizational management platform can access an application policy associated with a second third-party application of the plurality of third-party applications. The access of the application policy can be performed periodically and/or in specific response to receipt of the data from the first third-party application. The second third-party application can be different and distinct from the first third-party application. The application policy associated with the second third-party application can describe how changes to various forms of data (e.g., data contained in the platform's centralized database that stores the set of organizational data and/or data associated with other third-party applications) should cause actions (e.g., data updates) to be performed in the second third-party application. One or more application policies can be defined for each application. Application policies may be specific to each application and/or may be shared across multiple applications.

The organizational management platform can evaluate the application policy data associated with a second third-party application based at least in part on the first application data received from the first third-party application and based at least in part on the set of organizational data to determine one or more operations associated with implementing the application policy. The one or more operations associated with implementing the application policy can include causing an action to be performed in the second third-party application.

The organizational management platform can communicate with the second third-party application to cause the action to be performed in the second third-party application by the second third-party application. For example, the action in the second third-party application can include updating of data held by the second third-party application or other actions within the second third-party application (e.g., triggering of intra-application communications, etc.).

In some implementations, the application policy associated with the second third-party application can be a user-defined application policy defined by an administrator of the organizational management platform. As one example, the user-defined application policy can be a user-defined query expressed in a domain-specific query language. In such instances, evaluating the application policy can include executing the user-defined query relative to the set of organizational data. For example, the query may return a set of results (e.g., employee objects or other data objects) for which actions should be taken in the second third-party application.

To provide an example of the above-described process, suppose that a new employee is hired. During onboarding of the new employee, accounts may be created for the employee in each linked third-party application. According to aspects of the present disclosure, the account for the employee in one of the applications can be automatically configured based on data retrieved or otherwise obtained from another, different linked application. As an example, when a new employee is onboarded, an account may be created for the employee within an electronic mail application and within a time and attendance application. The organizational platform may automatically implement an application policy defined relative to the electronic mail application such that contact information for any employee who logged more than twenty hours per week in any of the last ten weeks in the time and attendance application is automatically populated for the new employee in the electronic mail application. Thus, data from the time and attendance application (e.g., which employees logged more than twenty hours recently) can be used to automatically configure the electronic mail application (e.g., by defining which electronic mail contacts get automatically populated for the new employee's account). This interaction can be automatically intermediated and effectuated by the organizational management platform implementing the defined application policy for the electronic mail application.

In another example, the proposed techniques can be applied to a software development application, such as an application that manages and facilitates collaborative work on different versions of computer-readable code (e.g., source code). In one example, if a proposed change (e.g., a "pull request") to a set of code owned or managed by a certain user has been outstanding/pending for longer than a threshold time period, the platform can implement an application policy to identify the user that is responsible for the set of code for which there is the proposed change. The platform can implement the application policy to provide an alert (e.g., email) to the user in a second, different application (e.g., a communications application such as an electronic mail application). Alternatively or additionally, the platform can implement the application policy to examine the user's record and/or other organizational data to understand who the user's manager is and then send the alert to the manager in the second application (e.g., the electronic mail application). Thus, organizational data (e.g., examining the user's employee record to identify the user's manager) can be evaluated by the application policy to define the action in the second application (e.g., the electronic mail application) based on data from the first application (e.g., the software development application). In yet a further example, data from a third application (e.g., a time and attendance application) can be examined by the application policy (e.g., to determine whether the specific user is currently on paid time off) and the resulting action can be impacted by the data from the third application (e.g., the alert in the second application can be held until such time as the user's paid time off expires).

In another example, the proposed techniques can be applied to an expense application. In one example, when an expense approval request is directed to a first user in a third-party expense management application, the organizational management platform can implement an application policy to automatically check application data in a third-party time and attendance application to understand if the first user is currently on paid time off. If so, the application policy can evaluate the employee record/organizational data to identify the manager or out-of-office alternative contact for the first user. The platform can then implement the application policy to re-route the expense approval request within the expense management application to the manager or out-of-office alternative contact for the first user. Thus, data from the second third-party application (e.g., the time and attendance application) can be used to modify or re-route actions within the first third-party application (e.g., the expense management application) in which the action originally initiated.

Thus, example aspects of the present disclosure are directed to an organizational management platform that controls and leverages organizational data to enable the automatic creation and implementation of different application policies which can be customized for different users or groups of users (e.g., groups of employees) included in a set of users (e.g., all employees of an organization). In particular, an organizational management platform can control and leverage organizational data to manage organizational applications including payroll, operations, human resources (e.g., onboarding and offboarding), benefits, information technology and device management, third-party application integration and access, and many others.

The organizational management platform can hold, for each of one or more organizations, a centralized set of organizational data that acts as a single, centralized system of record for all organizational management processes for that organization. Each organization can include a number of users which are able to access and interact with the organizational management platform. Some users may have administrative permissions which define whether the user is able to access and/or modify certain types of organizational data for their organization.

The organizational data for each organization can include data directly entered into the organizational management platform and/or can include data retrieved, pulled, or otherwise obtained from one or more first party and/or third-party applications with which the organizational management platform may have varying levels of integration. This ingestion and storage of data from third-party applications is in contrast to systems that simply sit on top of third-party applications and apply rules at run time. In some implementations, the organizational management platform can provide a user with the ability (e.g., by configuring Simple Mail Transfer Protocol (SMTP) settings) to configure the cadence or periodicity at which the organizational management platform receives or ingests data (e.g., via .csv files) from third-party applications.

The organizational data can, in some implementations, be held as one or more object databases. For example, multiple object classes can be defined in the object databases. Example object classes include employees, devices, job candidates, benefits policies, documents, pay instances, time cards, and/or other objects. For each object, values can be provided and maintained for one or more attributes, such as location, role, salary, etc. Links can be made between different objects. For example, one or more device objects can be associated with employee objects.

The object database(s) can be represented as or can store data which can be represented as one or more graphs with nodes that correspond to objects and edges that correspond to links or logical associations between objects and/or object attribute(s). Graph(s) can be traversed to understand or leverage relationships among objects and their attribute(s). In one example, the organizational data can be synthesized into a single graph which includes multiple classes of objects and defines complex relationships among objects and their attribute(s). For example, all workflows, including payroll, IT, etc. can be run through one platform and graph.

In some implementations, the organizational data can include organizational structure data. For example, the organizational structure data can be encoded within links or edges defined between objects of the organizational data or can be stored as a separate data layer. For example, the organizational structure data can define organizational relationships between objects, including employee objects. As one example, the organizational structure data may indicate that a first employee object has the relationship of "manager" relative to a second employee object. The organizational relationships can be defined between specific objects and/or groups of objects. As another example, the organizational structure data may indicate that a first group of employees (e.g., the "IT Administrator" group of employees) has a certain set of permissions (e.g., device activation/deactivation) relative to a particular group of devices (e.g. the "work laptops" group of the devices) or applications (e.g., extra-organizational applications).

According to one example aspect, an administrator or other user of the organizational management platform can be enabled to define an application policy that is a function of, defined according to, or otherwise makes reference to or queries against the organizational data. When used to define or implement application policies, the organizational management platform may be referred to as an application policy computing system.

Thus, different application policies can be defined for different users or groups of users on the basis of the organizational data. When a user seeks to access, control, and/or modify one or more devices, applications, and/or datasets, the appropriate application policy can be accessed and evaluated based on the organizational data associated with the user.

As one simplified example, an employee group "IT administrators" which is defined within the organizational data can have an application policy (e.g., updating the organizational data associated with a first application triggers updating the organizational data associated with a second unrelated application). Thus, a user can configure and implement an application policy that can use organizational data associated with various applications to perform operations using a different set of applications.

According to another example aspect, in some implementations, some or all of the customized application policies can be defined using one or more expressions written in a query language. The expressions in the query language may include one or more queries which query against the organizational data to return a result.

For example, the query language can be a domain-specific query language that can be used to perform (e.g., in real time) queries against the organizational data. The query language can be used to define functions or queries which return data that satisfies or responds to the functions or queries. In some implementations, the query language is a declarative language. In some implementations, the query language includes organization functions or operators which leverage organizational relationships within the organizational data. For example, the organization function ORG (employee,relationship) returns one or more other employees that have the specified relationship to the specified employee.

As described above, an administrator or other user of the system can generate and cause the implementation of customized application policies which are expressed using one or more query expressions which query against a set of organizational data. This enables linking the organizational data (e.g., human resources data or other employee data) to device management, application access/control, and/or other forms of access rights management and application policies. As such, a single, core source of organizational data can flow through to custom application policies. The application policies can define rules about software installations or other settings, including push settings and/or pull settings.

The disclosed technology can be used to generate and/or configure an application policy that defines the configuration of certain extra-organizational applications. The application policy can use data (e.g., organizational data) that is pulled from one application to perform operations using a different extra-organizational application, potentially with organizational data (e.g., one or more employee records) layered on top.

For example, when a new employee is hired by an organization, e-mail contact information pulled from an extra-organizational e-mail application can be automatically added to the new employee's list of e-mail contacts. Further, the e-mail contact information can include the e-mail contact information of any employee of the organization that has logged more than twenty (20) hours of time into a timesheet application in the past ten (10) weeks.

In another example, the disclosed technology can determine when a pull request for an extra-organizational source code management application has been unfulfilled by an employee for greater than a threshold time period. When the threshold time period has elapsed, the relevant employee can be e-mailed to remind the employee to fulfill the request. Further, the disclosed technology can use the organizational data to determine the identity of the employee's manager and send a reminder e-mail to the manager.

By way of further example, when an expense approval request is sent to an employee of an organization, the disclosed technology can automatically use the organizational data associated with the employee's calendar application to check whether the employee is out of the office. If the employee is out of the office, analysis of the organizational data can be used to determine the employee's manager, and the expense approval request can be directed to the employee's manager or other individual that can handle the expense approval request when the employee is determined to be out of the office.

In some implementations, the application policy computing system can include a graphical user interface that offers users a quick and easy way to configure and implement application policies without having to learn complex rules and syntax. For example, a user can create an application policy for a user or group of users by choosing from predetermined rules, operators, and conditions that are displayed on a graphical user interface. In this way, the potentially complicated process of using specialized expressions and queries can be avoided or significantly reduced. Instead, the user can create application policies via a front-end that facilitates creation of comprehensive application policies without sacrificing specificity or coverage of users.

By way of example, a computing system implementing the disclosed technology can access application policy data that is used to implement an application policy based in part on rules and organizational data associated with different sets of extra-organizational applications (e.g., third-party applications). The computing system can then determine the organizational records of the organizational data that satisfy the rules. For example, rules that are directed to certain employees and applications would be associated with the subset of organizational records related to those employees and applications. The computing system can then access the applications that satisfy the rules and implement the application policy by applying the rules of the application policy to applications associated with the relevant organizational records of the organizational data. For example, the application policy can use organizational data associated with a user of one application to determine an operation that involves accessing a different and unrelated application that is used by the same user.

Accordingly, the disclosed technology may improve the effectiveness with which application policies are configured, generated, and/or implemented. In particular, the disclosed technology can facilitate the creation of an application policy via a user friendly interface that an authorized user can use to create an application policy without the burdensome need to remember complex rules or queries. Further, the disclosed technology can leverage organizational data as the basis for application policies, by retrieving relevant information from one or more organizational records that may be used to implement the application policy on the relevant set of applications and associated organizational records.

The computing system can access, receive, obtain, and/or retrieve data (e.g., application policy data and/or organizational data). The data can include application policy data associated with implementing an application policy (e.g., an application policy including one or more policies) and/or organizational data comprising information associated with an organization. The organizational data can include one or more organizational records each of which can include information associated with one or more employees of the organization, one or more applications associated with the organization, and/or an organizational structure indicating at least the relative positions of the one or more employees and/or the one or more applications that are associated with each of the one or more employees of the organization.

The application policy data can include one or more rules. The one or more rules can be associated with implementing an application policy by using organizational data associated with a plurality of applications. The one or more rules can include one or more constraints and/or one or more limitations that can be used to regulate access, authentication, and/or authorization associated with the organizational data and/or the plurality of applications. For example, the one or more rules can constrain the scope of the application policy to certain groups of users (e.g., certain teams within an organization). Further, the one or more rules can be directed to the performance of specific operations or actions when some condition has been met.

The plurality of applications can include a set of one or more extra-organizational applications that perform one or more operations associated with a different set of one or more extra-organizational applications. For example, a set (e.g., a first set) of the one or more extra-organizational applications can include a time-keeping application and a different set (e.g., a second set) of one or more extra-organizational applications can include an e-mail application.

A different set of one or more extra-organizational applications can include at least one different application than the set of one or more extra-organizational applications. In some embodiments, the set of one or more extra-organizational applications and the different set of one or more extra-organizational applications are mutually exclusive.

In some embodiments, the plurality of applications can include a set of one or more applications (e.g., one or more applications including one or more intra-organizational applications and/or one or more extra-organizational applications) that perform one or more operations associated with a different set of one or more extra-organizational applications (e.g., one or more applications including one or more intra-organizational applications and/or one or more extra-organizational applications). The different set of one or more applications can include at least one different application from the set of one or more applications. In some embodiments, the set of one or more applications and the different set of one or more applications are mutually exclusive and do not have any applications in common.

In some embodiments, the organizational data can include information associated with one or more relationships between the one or more organizational records. For example, the organizational data can include information associated with the position (e.g., relative position and/or absolute position) of one or more employees of an organization. The one or more respective positions of the one or more employees can be used to determine the one or more applications that the employees are authorized to access and the level of access to the one or more applications that is available to each user.

The application policy can limit the performance of one or more operations based at least in part on the one or more relationships. For example, the application policy can limit performance of the one or more operations that implement the application policy to the one or more employees above the relative position of an employee (e.g., the managers of that employee) or below the absolute level of another employee (e.g., the subordinates of that employee).

In some embodiments, performing the one or more operations associated with implementing the application policy can include accessing the one or more organizational records based at least in part on the one or more relationships, authorizing one or more actions associated with the one or more extra-organizational applications based at least in part on the one or more relationships, an/or communicating with one or more entities associated with the one or more organizational records based at least in part on the one or more relationships.

In some embodiments, a portion of organizational data is based at least in part on remote data received from one or more remote computing devices associated with the one or more extra-organizational applications. For example, one or more extra-organizational can periodically send information associated with activity relating to the plurality of applications. The information relating to the activity of the plurality of applications can include when each of the plurality of applications was accessed, pending operations for each of the plurality of operations to perform, and/or communications to and from each of the plurality of applications.

The organizational data and/or the one or more organizational records can include one or more employee records associated with one or more employees of an organization. For example, the one or more employee records can include one or more employee names, one or more positions (e.g., positions and/or roles of the one or more employees which can include respective positions within an organizational hierarchy), one or more groups (e.g., groups including teams that are associated with the one or more employee records), and/or one or more of the plurality of applications that are associated with each of the one or more employees.

In some embodiments, the organizational data and/or the application policy data is owned (e.g., exclusive ownership) and controlled by an organization. For example, the organizational data and/or the application policy data can be owned and managed by the organization on computing devices under the control of the organization (e.g., local computing devices in the organization's premises and/or remote computing devices with encrypted data and keys to decrypt the encrypted data that are under the control of the organization).

In some embodiments, a portion of the one or more extra-organizational applications are not owned and/or controlled by the organization. For example, the plurality of applications can include one or more extra-organizational applications that are not under the ownership and/or control of the organization that has ownership and/or control of the organizational data and/or the application policy data. Further, in some implementations, a portion of the one or more extra-organizational applications can be at least partially under the ownership or control of an entity that is not the organization. For example, a portion of the one or more extra-organizational applications can be under the partial ownership and/or partial control of a third-party organization.

The one or more extra-organizational applications can include one or more third-party applications and/or one or more third-party services associated with the one or more extra-organizational applications. The one or more third-party applications and/or the one or more third-party services can be associated with an organization that is different from the organization that has ownership and/or control over the organizational data and/or the application policy data. For example, the one or more extra-organizational applications can include an e-mail application that is used by an organization under license from a third-party that created and maintains the e-mail application on a remote computing device that is provided by another third-party hardware provided (e.g., a cloud computing service used by the organization).

In some embodiments, the one or more extra-organizational applications can include one or more e-mail applications, one or more payroll management applications, one or more project management applications, one or more application management applications, and/or one or more human resources applications. The one or more extra-organizational applications may be configured to communicate and/or exchange information with any of the plurality of applications.

The computing system can determine one or more organizational records of the organizational data that satisfy the one or more rules. Determining the one or more organizational records of the organizational data that satisfy the one or more rules can be based at least in part on the application policy data, the organizational data, and/or the plurality of applications. For example, the computing system can analyze the one or more organizational records to determine the set of the one or more organizational records that satisfy the one or more rules. The one or more organizational records that satisfy the one or more rules will include one or more fields that are associated with the one or more rules. For example, the one or more rules can specify a particular set of users and satisfying the one or more organizational records will result in the one or more organizational records associated with that particular set of users.

The computing system can access the plurality of applications and/or the one or more organizational records that satisfy the one or more rules. For example, the computing system can access the plurality of applications associated with the one or more organizational records that satisfy the one or more rules associated with using a particular set of the one or more extra-organizational applications to send a welcome e-mail to a new employee. Further, accessing the plurality of applications associated with the one or more organizational records may include accessing any data and/or information that is generated by the plurality of applications.

The computing system can compare the one or more rules to one or more organizational policies that can be associated with the organizational data. Comparing the one or more rules to the one or more organizational policies can include determining one or more differences and/or one or more similarities between the one or more rules and the one or more organizational policies.

The one or more organizational policies can include one or more pre-existing policies associated with the plurality of applications and/or the organizational data. The one or more organizational policies can determine the one or more operations that can be performed on the plurality of applications and/or the organizational data. The one or more organizational policies can include one or more access policies that define the one or more employees of an organization that are allowed to access the plurality of applications as well as the respective authorization level associated with the one or more employees. For example, the one or more access policies can determine that the users associated with a particular team associated with certain organizational records can access a particular set of the plurality of applications.

In some embodiments, the one or more rules and the one or more organizational policies can be respectively associated with one or more authorization levels. Further, the one or more rules that conflict with the one or more organizational policies and have a lower authorization level than the one or more organizational policies can be determined not to be in compliance with the one or more organizational policies and will therefore not be used in implementing the application policy. The application policy data will then be based at least in part on the one or more rules that are in compliance with the one or more organizational policies.

Furthermore, the computing system can determine that the one or more rules that are not in compliance with the one or more organizational policies are not used to implement the application policy. As such, the application policy data will then be based at least in part on the one or more rules that are in compliance with the one or more organizational policies.

The computing system can perform one or more operations associated with implementing the application policy. Performance of the one or more operations can be based at least in part on the application policy and/or the one or more organizational records. For example, the computing system can use team (e.g., organizational team) membership information obtained from the one or more organizational records to access various communications applications (e.g., e-mail applications and instant messaging applications) associated with that team. The computing system can then send notices and reminders (via an e-mail application and instant messaging application) to members of that team when a task assigned to that team is overdue.

In some embodiments, performing the one or more operations associated with implementing the application policy can include detecting whether a predetermined operation associated with the set of one or more extra-organizational applications has been performed. For example, the computing system can operate an event listener that determines whether the predetermined operation (e.g., accessing an application) has been performed.

Based at least in part on the detection of the predetermined operation being performed, the computing system can perform another operation (e.g., a different operation) on the different set of one or more extra-organizational applications. Performance of the predetermined operation can function as a trigger that causes the computing system to perform another predetermined operation. For example, in response to detecting that an application has sent a reminder message to an employee for an overdue task, the computing system can determine the employee's manager and send a reminder to the employee's manager.

In some embodiments, the one or more organizational records can include one or more credentials that can be used to access a portion of the one or more extra-organizational applications. Further, performing the one or more operations associated with implementing the application policy can include accessing the one or more organizational records that include the one or more credentials. For example, the computing system can access the organizational records to obtain the login credentials for an employee's calendar.

Further, performing the one or more operations associated with implementing the application policy can include accessing the plurality of applications (e.g., the set of one or more extra-organizational applications and/or the different set of the one or more extra-organizational applications) based at least in part on the one or more credentials. For example, the computing system can access an employee's calendar application using the employee's login credentials for the calendar application. The computing system can then perform one or more operations associated with the employee's calendar application.

The application policy data and/or the organizational data can include a time constraint for a time constrained operation associated with the plurality of applications. The time constraint can act as a constraint on the performance of an operation associated with the plurality of applications (e.g., the one or more extra-organizational applications). For example, the time constraint can be used as the basis for a deadline for a pending operation or a reminder for an operation scheduled for some time in the future.

In some embodiments, the time constraint can include a threshold amount of time before which the time constrained operation is due to be performed. For example, the time constraint can indicate that the time constrained operation is to be performed after the threshold amount of time elapses (e.g., a reminder message is sent after the threshold amount of time elapses).

In other embodiments, the time constraint can include a threshold amount of time after which the time constrained operation is due to be performed. For example, the time constraint can indicate that the time constrained operation is to be performed before the threshold amount of time elapses (e.g., a task is to be submitted before the threshold amount of time elapses).

In some embodiments, performing the one or more operations associated with implementing the application policy can include accessing the organizational data and/or the application policy data that comprises the time constraint. For example, the one or more rules of the application policy data can include the time constraint and the data and/or information associated with the time constraint can be accessed when the application policy data is accessed.

Further, performing the one or more operations associated with implementing the application policy can include performing the time constrained operation on the plurality of applications (e.g., the set of one or more extra-organizational applications). For example, a time constraint associated with a meeting reminder for an employee of an organization can be used to cause the computing system to use an e-mail application to send a reminder to that employee.

In some embodiments, performing the one or more operations associated with implementing the application policy can include modifying the organizational data and/or the plurality of applications based at least in part on the application policy. Modifying the organizational data can include populating one or more fields of the one or more organizational records with one or more corresponding values obtained from the one or more extra-organizational applications, adding one or more organizational records to the organizational data, and/or removing one or more organizational records from the organizational data. Modifying the plurality of applications can include applying one or more software updates to the plurality of applications.

In some embodiments, performing the one or more operations associated with implementing the application policy can include performing at least one operation on an extra-organizational application based at least in part on performance of an operation by a different extra-organizational application. For example, when a first extra-organizational application causes the organizational data to be updated, a second extra-organizational application will perform an operation associated with generating a notification that the first extra-organizational application was updated.

In some embodiments, performing the one or more operations associated with implementing the application policy can include communicating information between the one or more extra-organizational applications, requesting information from the one or more extra-organizational applications, and/or performing one or more operations using the one or more extra-organizational applications.

In some embodiments, the application policy data and/or the application policy can include and/or be based at least in part on an application specific query language that is configurable to generate one or more expressions that are used to access, modify, and/or control the organizational data, the application policy data, and/or the plurality of applications including one or more extra-organizational applications. For example, the one or more rules can be based at least in part on an expression that is created using an application specific query language that may be configured to access the organizational data and/or an application associated with the organizational data. Further, the application specific query language may be used as the basis for one or more inputs provided by a user to configure the application policy data and/or the application policy. For example, a user can enter (via a keyboard device) one or more rules defining the types of actions that will be performed by the plurality of applications.

The computing system can receive, access, and/or obtain one or more inputs via a graphical user interface configured to display one or more policy options associated with the application policy. The one or more policy options can include one or more conditions and/or one or more actions associated with the one or more extra-organizational applications. The one or more conditions and/or the one or more actions can be associated with the one or more rules.

The one or more conditions can include one or more aspects of the one or more organizational records that will satisfy one or more of the one or more rules and cause the one or more actions which can be performed by at least one of the plurality of applications. For example, the one or more policy options can allow a user to generate and/or configure application policy data in which a group of users (e.g., a department of an organization) will receive instructions on how to use a new software application the first time each of the group of users accesses the new software application.

The computing system can generate the application policy data and/or the application policy based at least in part on the one or more inputs. The computing system can use the one or more inputs to the one or more policy options to generate an expression (e.g., an expression that can include an application specific query) that can be used as the basis of the application policy. For example, each of the inputs can be associated with the one or more rules and/or a portion of the organizational data, and the computing system can generate and/or configure the application policy data to include the one or more rules and/or organizational data associated with the one or more inputs.

In some embodiments, the application policy data and/or the application policy can be associated with one or more geographic constraints on accessing a portion of the plurality of applications from one or more geographic locations that can be specified by the one or more rules. For example, the one or more constraints can constrain access to certain applications from a specified set of geographic locations (e.g., a remote location that is outside an organizational LAN).

The disclosed technology can include a computing system and/or computing device that is configured to perform various operations associated with the generation and/or implementation of one or more application policies. In some embodiments, the user computing system can be associated with various computing systems and/or devices that use, send, receive, and/or generate information and/or data associated with the generation and/or implementation of one or more application policies. Furthermore, the user computing system can process, generate, modify, and/or access (e.g., send and/or receive) data and/or information including data and/or information associated with one or more application policies, one or more organizational policies, one or more extra-organizational applications, organizational data, and/or one or more organizational records.

In some implementations, the disclosed computing system can be operated from a server computing system that may be accessed by a user via one or more computing devices that are connected to the server computing system.

Further, the disclosed computing system can be configured to access organizational records that may be stored locally and/or at remote locations that are accessible via a communications network (e.g., a Local Area Network (LAN) and/or the Internet).

The computing device can include specialized hardware and/or software that enables the performance of one or more operations specific to the disclosed technology. The user computing system can include one or more application specific integrated circuits that are configured to perform operations associated with the generation, configuration, and/or implementation of one or more application policies.

The systems, methods, devices, apparatuses, and tangible non-transitory computer-readable media in the disclosed technology can provide a variety of technical effects and benefits including improvements in the generation, configuration, and implementation of application policies. In particular, the disclosed technology may assist a user (e.g. an administrator of application policies for an organization) in performing a technical task by means of a continued and/or guided human-machine interaction process in which the user can interact with a user interface that can be used to generate and/or configure an application policy that is used to regulate the performance of operations associated with accessing, modifying, and/or controlling organizational data and/or a plurality of applications including one or more extra-organizational applications that may be associated with the organizational data. Furthermore, the disclosed technology may also provide benefits including improvements in computing resource usage efficiency, data coherence and consistency, and ease of use.

The disclosed technology can provide a variety of technical effects and benefits with respect to the efficiency of computing resource usage by reducing the number of different operations involved in implementing an application policy. By using organizational data as a basis for generating an application policy, the disclosed technology can access a centralized source of information that can provide information on interactions between members of an organization and their related applications that may not be possible when the member information or application is dealt with on an individual basis. In this way, the fragmented approach in which different sets of applications are individually accessed can be reduced and/or avoided, thereby reducing the number of operations that must be performed, thereby freeing up valuable computing resources.

Furthermore, the disclosed technology can be used in the generation of application policies that apply to large groups of users and applications. By implementing application policies that apply to large groups of users, the disclosed technology can avoid the duplication of effort that may result from managing users or applications sequentially. Further, the use of rules in the application policy may result in more coherent and consistent organizational data due to a reduction in the amount of conflicting information and/or instructions in the organizational data since the rules ensure that the application policy is in compliance with existing organizational policies.

Additionally, the disclosed technology offers increased ease of use for users by allowing the generation or configuration of custom tailored application policies that can cover a wider range of use cases in a shorter amount of time, and with greater precision than a one-size fits all approach in which generic application policies that may be too restrictive for some users and too lax for other users are implemented. Further, the highly configurable nature of the disclosed technology allows users to create application policies that leverage the employee relationships and organizational structure of the underlying organization.

As such, the disclosed technology may assist a user in more effectively performing a variety of application policy oriented tasks by providing the specific benefits of improved computing resource usage efficiency, improved organizational data coherence and consistency, customizability, and ease of use. Further, any of the specific benefits provided to users can be used to improve the effectiveness of a wide variety of devices and services including any devices or services that rely on the disclosed technology. Accordingly, the improvements offered by the disclosed technology can result in tangible benefits to a variety of applications, devices, and/or systems including mechanical, electronic, and computing systems associated with the generation, configuration, and implementation of application policies.

With reference to the Figures, example embodiments of the present disclosure will be discussed in further detail.

FIG. 1 depicts a block diagram of an example environment including a computing system that performs operations according to example embodiments of the present disclosure. The environment 100 includes a network 102, a computing system 110, one or more computing devices 112, one or more processors 114, one or more memory devices 116, data 118, instructions 120, a remote computing system 130, one or more computing devices 132, one or more processors 134, one or more memory devices 136, data 138, instructions 140, one or more computing devices 152, one or more processors 154, one or more memory devices 156, data 158, and instructions 160.

The network 102 can include any type of communications network. For example, the network 102 can include a local area network (LAN), a wide area network (WAN), an intranet, an extranet, and/or the Internet. Further, the network 102 can include any number of wired or wireless connections and/or links that can be used to communicate with one or more systems (e.g., the computing system 110 and/or the remote computing system 130) and/or one or more devices (e.g., the one or more computing devices 152). Communication over the network 102 can be performed via any type of wired and/or wireless connection and can use a wide variety of communication protocols (e.g., TCP/IP, HTTP, SMTP, FTP), encodings or formats (e.g., HTML, XML), and/or protection schemes (e.g., VPN, secure HTTP, SSL).

The computing system 110 can include any combination of systems and/or devices including one or more computing systems and/or one or more computing devices. Further, the computing system 110 may be connected (e.g., networked) to one or more computing systems and/or one or more computing devices via the network 102. The computing system 110 may operate in various different configurations including as a server or a client machine in a client-server network environment, or as a peer machine in a peer-to-peer (or distributed) network environment. Though the computing system 110 is depicted in FIG. 1 as a single device, the computing system 110 can include any collection or combination of devices that individually or in combination with other devices, execute a set of one or more instructions to perform any one or more of the operations discussed herein.

In this example, the computing system 110 includes the one or more computing devices 112. The one or more computing devices 112 can include any type of computing device. For example, the one or more computing devices 112 can include a personal computing device (e.g., a desktop computing device), a mobile computing device (e.g., a smartphone or tablet), a wearable computing device (e.g., a smartwatch), an embedded computing device, a web appliance, a server computing device, a network router, a switch, a bridge, or any device capable of executing a set of instructions (e.g., any combination of instructions which can include sequential instructions and/or parallel instructions) associated with one or more operations and/or one or more actions to be performed by the computing system 110 or any of the constituent components and/or devices of the computing system 110.

Any of the one or more computing devices 112 can include the one or more processors 114. The one or more processors 114 can include any processing device (e.g., a processor core, a microprocessor, an ASIC, a FPGA, a controller, or a microcontroller) and can include one processor or a plurality of processors that may be operatively connected. In some embodiments, the one or more processors 114 may include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

The one or more computing devices 112 can include the one or more memory devices 116. The one or more memory devices 116 can be used to store data and/or information and can include one or more computer-readable media, one or more non-transitory computer-readable storage media, and/or one or more machine-readable media. Though the one or more memory devices 116 are depicted in FIG. 1 as a single unit (e.g., a single medium), the computer-readable storage media can include a single medium or multiple media (e.g., a centralized or distributed database, and/or associated caches and servers) that store one or more sets of instructions. Further, the computer-readable storage media can include any medium that is capable of storing, encoding, and/or carrying a set of instructions for execution by a computing device and which may cause the computing device to perform any of the one or more operations described herein. In some embodiments, the computer-readable storage media can include one or more solid-state memories, one or more optical media, and/or one or more magnetic media. By way of example, the one or more memory devices 116 can include any combination of random access memory (RAM), read only memory (ROM), EEPROM, EPROM, one or more flash memory devices, one or more magnetic storage devices (e.g., one or more hard disk drives).

The one or more processors 114 can be configured to execute one or more instructions to perform the operations described herein including for example, one or more operations associated with configuring and/or generating an application policy and implementing the application policy. Further, the one or more memory devices 116 can store the data 118 and/or the instructions 120, which can be executed by the one or more processors 114 to cause the one or more computing devices 112 to perform one or more operations. For example, the one or more operations performed by the one or more processors 114 can include accessing application policy data that includes one or more rules; determining organizational records that satisfy one or more rules; accessing applications (e.g., extra-organizational applications) associated with the organizational records that satisfy the one or more rules; and/or performing operations to implement the application policy.

The data 118 can include organizational data (e.g., organizational data that can include one or more organizational records), rule data (e.g., rule data that includes one or more rules used to configure an application policy), application data (e.g., application data associated with a plurality of applications including one or more extra-organizational applications and/or one or more intra-organizational applications), organizational policy data (e.g., organizational policy data associated with one or more organizational policies), application policy data (e.g., policy data that includes one or policies associated with the organizational data, the rule data, the application data, one or more applications, one or more devices, and/or data) are described herein. Further, the instructions 120 can include one or more instructions to use data including the data 118 to perform the one or more operations described herein. In some embodiments, the one or more memory devices 116 can be used to store one or more applications that can be operated by the one or more processors 114. The data 118, the instructions 120, and/or the one or more applications can be associated with an organization. Further, the computing system 110 may be associated with an organization and may be configured to manage the one or more applications. For example, the computing system 110 can perform one or more operations associated with authenticating one or more users that attempt to access the one or more applications which can include one or more extra-organizational applications that may be remote from the computing system 110.

Any of the one or more computing devices 112 can include one or more input devices 122 and/or one or more output devices 124. The one or more input devices 122 can be configured to receive input (e.g., user input) and can include one or more touch screens, one or more keyboards, one or more pointing devices, (e.g., mouse device), one or more buttons, one or more microphones, and/or one or more cameras. The one or more output devices 124 can include one or more display devices, one or more loudspeaker devices, one or more haptic output devices. By way of example, the one or more output devices 124 can be used to display a graphical user interface via a display device that can include a touch screen layer that is configured to detect one or more inputs (e.g., one or more user inputs). The one or more processors 114 may perform one or more operations (e.g., operations associated with implementing an application policy) based at least in part on the one or more inputs.

The remote computing system 130 includes the one or more computing devices 132. Each of the one or more computing devices 132 can include one or more processors 134, one or more memory devices 136, the data 138, and/or the instructions 140. The remote computing system 130 can include any of the attributes and/or capabilities of the computing system 110. Further, the remote computing system 130 can communicate with one or more devices and/or one or more systems via the network 102.

In some embodiments, the remote computing system 130 can include one or more applications (e.g., computing software applications) that can be stored and/or executed by the remote computing system 130. Further, the one or more applications can include one or more extra-organizational applications that may be accessed from the computing system 110 and which are at least partly operated from the remote computing system 130. The one or more extra-organizational applications can be associated with an organization that is different from the organization that is associated with the computing system 110 (e.g., the extra-organizational applications can include one or more third-party applications). Further, the data 138 can include one or more portions of the organizational data (e.g., one or more organizational records), the rules data, the application policy data, and/or organizational policy data.

Figure 2:
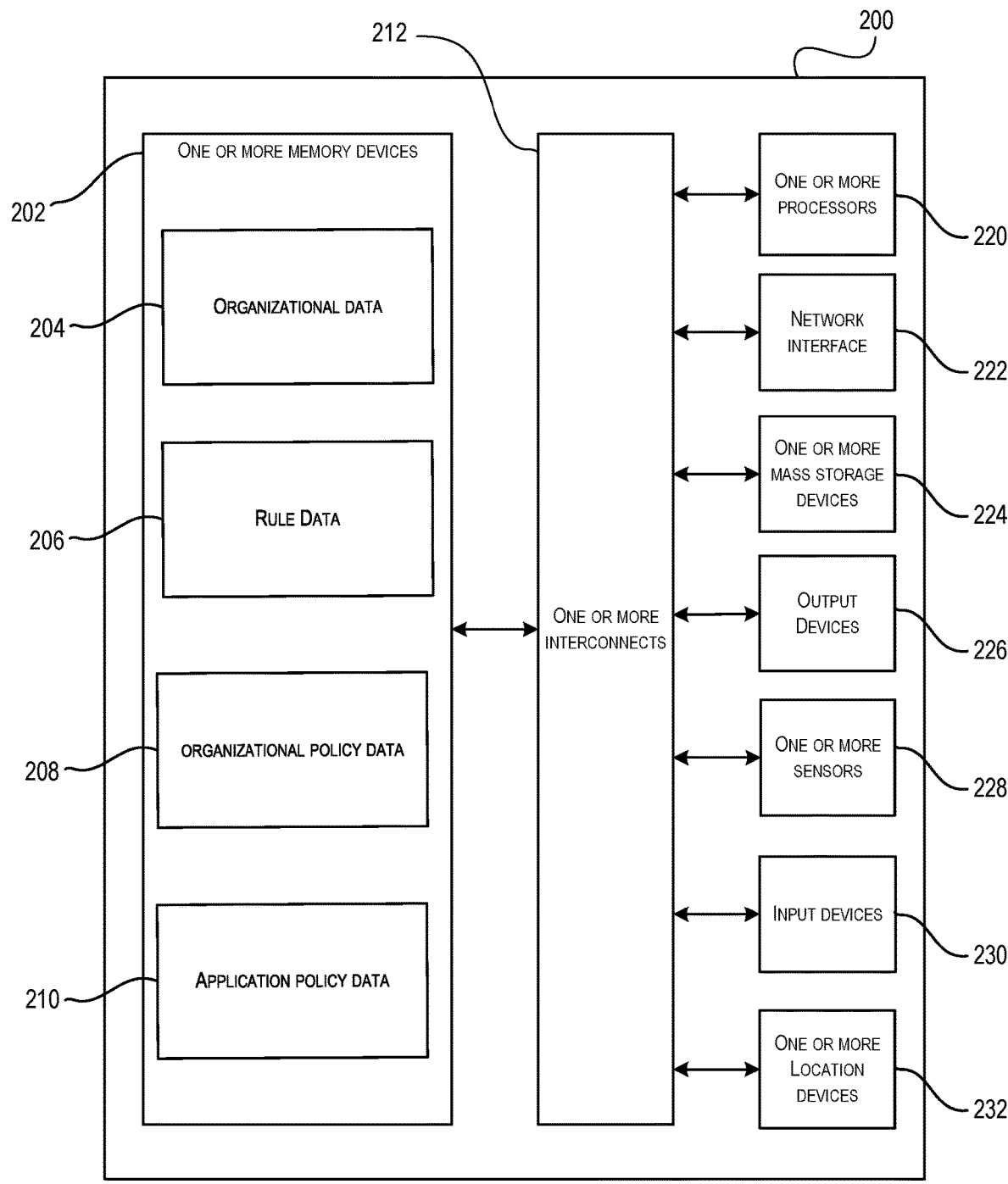
FIG. 2 depicts a block diagram of an example of a computing device according to example embodiments of the present disclosure.

FIG. 2 depicts a block diagram of an example computing device according to example embodiments of the present disclosure. A computing device 200 can include one or more attributes and/or capabilities of the computing system 110, the remote computing system 130, the one or more computing devices 152, and/or the computing device 200. Furthermore, the computing device 200 can be configured to perform one or more operations and/or one or more actions that can be performed by the computing system 110, the remote computing system 130, the one or more computing devices 152, and/or the computing device 200.

As shown in FIG. 2, the computing device 200 can include one or more memory devices 202, organizational data 204, rule data 206, organizational policy data 208, application policy data 210, one or more interconnects 212, one or more processors 220, a network interface 222, one or more mass storage devices 224, one or more output devices 226, one or more sensors 228, one or more input devices 230, and/or the location device 232.

The one or more memory devices 202 can store information and/or data (e.g., the organizational data 204, the rule data 206, and/or the organizational policy data 208). Further, the one or more memory devices 202 can include one or more non-transitory computer-readable storage media, including RAM, ROM, EEPROM, EPROM, flash memory devices, magnetic disks, and combinations thereof. The information and/or data stored by the one or more memory devices 202 can be executed by the one or more processors 220 to cause the computing device 200 to perform operations including one or more operations associated with accessing application policy data that includes one or more rules associated with organizational data and a plurality of applications including extra-organizational applications, determining organizational records of the organizational data that satisfy the rules, accessing the plurality of applications, and performing one or more operations associated with implementing the application policy.

The organizational data 204 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. Furthermore, the organizational data 204 can include information associated with one or more applications (e.g., one or more extra-organizational applications), one or more organizational records and/or one or more organizational policies. In some embodiments, the organizational data 204 can be received from one or more computing systems (e.g., the remote computing system 130 depicted in FIG. 1) which can include one or more computing systems that are remote (e.g., in another room, building, part of town, city, or nation) from the computing device 200.

The rule data 206 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. Furthermore, the rule data 206 can include information associated with one or more rules that can be used to generate and/or implement an application policy. In some embodiments, the rule data 206 can be received from one or more computing systems (e.g., the remote computing system 130 depicted in FIG. 1) which can include one or more computing systems that are remote from the computing device 200.

The organizational policy data 208 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. Furthermore, the organizational policy data 208 can include information associated with one or more organizational policies that are used to regulate one or more applications (e.g., one or more extra-organizational applications), one or more computing devices, and/or one or more records which can include one or more organizational records and/or one or more employee records. In some embodiments, the organizational policy data 208 can be received from one or more computing systems (e.g., the remote computing system 130 depicted in FIG. 1) which can include one or more computing systems that are remote from the computing device 200.

The application policy data 210 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. Furthermore, the application policy data 210 can include information associated with one or more policies that are used to implement an application policy associated with one or more applications (e.g., one or more extra-organizational applications), one or more computing devices, and/or one or more records which can include one or more organizational records and/or one or more employee records. In some embodiments, the organizational policy data 208 can be received from one or more computing systems (e.g., the remote computing system 130 depicted in FIG. 1) which can include one or more computing systems that are remote from the computing device 200.

The one or more interconnects 212 can include one or more interconnects or buses that can be used to send and/or receive one or more signals (e.g., electronic signals) and/or data (e.g., the organizational data 204, the rule data 206, the organizational policy data 208, and/or the application policy data 210) between components of the computing device 200, including the one or more memory devices 202, the one or more processors 220, the network interface 222, the one or more mass storage devices 224, the one or more output devices 226, the one or more sensors 228 (e.g., a sensor array), the one or more input devices 230, and/or the location device 232. The one or more interconnects 212 can be arranged or configured in different ways. For example, the one or more interconnects 212 can be configured as parallel or serial connections. Further the one or more interconnects 212 can include: one or more internal buses that are used to connect the internal components of the computing device 200; and one or more external buses used to connect the internal components of the computing device 200 to one or more external devices. By way of example, the one or more interconnects 212 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the organizational data 204, the rule data 206, the organizational policy data 208, and/or the application policy data 210. The one or more processors 220 can include single or multiple core devices including a microprocessor, microcontroller, integrated circuit, and/or a logic device.

The network interface 222 can support network communications. The network interface 222 can support communication via networks including a local area network and/or a wide area network (e.g., the Internet). For example, the network interface 222 can allow the computing device 200 to communicate with the computing system 110 via the network 102.

The one or more mass storage devices 224 (e.g., a hard disk drive and/or a solid state drive) can be used to store data including the organizational data 204, the rule data 206, and/or the organizational policy data 208. The one or more output devices 226 can include one or more display devices (e.g., liquid crystal display (LCD), OLED display, mini-LED display, micro-LED display, plasma display, and/or cathode ray tube (CRT) display), one or more light sources (e.g., LEDs), one or more loudspeakers, and/or one or more haptic output devices (e.g., one or more devices that are configured to generate vibratory output).

The one or more sensors 228 can be configured to detect various states and can include one or more cameras, one or more light detection and ranging (LiDAR) devices, one or more sonar devices, and/or one or more radar devices. Further, the one or more sensors 228 can be used to provide input (e.g., an image of a user captured using the one or more cameras) that can be used as part of configuring an application policy. For example, the one or more sensors 228 can be used to authenticate the identity of a user and determine an authorization level based on an image of the user's face that is captured using the one or more sensors 228.

The one or more input devices 230 can include one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that are used to detect gestures that can trigger one or more operations by the computing device 200).

Although the one or more memory devices 202 and the one or more mass storage devices 224 are depicted separately in FIG. 2, the one or more memory devices 202 and the one or more mass storage devices 224 can be regions within the same memory module. The computing device 200 can include one or more additional processors, memory devices, network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. For example, the one or more memory devices 202 can store sets of instructions for one or more applications (e.g., one or more intra-organizational applications and/or one or more extra-organizational applications) that are subject to one or more application policies that can be configured, generated, and/or implemented by the computing device 200 and/or one or more other computing devices or one or more computing systems. In some embodiments, the one or more memory devices 202 can be used to operate or execute a general-purpose operating system that operates on mobile computing devices and/or and stationary devices, including for example, smartphones, laptop computing devices, tablet computing devices, and/or desktop computers.

The software applications that can be operated or executed by the computing device 200 can include applications associated with the computing system 110, the remote computing system 130, and/or the one or more computing devices 152 that are depicted in FIG. 1. Further, the software applications that can be operated and/or executed by the computing device 200 can include native applications, web services, and/or web-based applications.

The location device 232 can include one or more devices or circuitry for determining the position of the computing device 200. For example, the location device 232 can determine an actual and/or relative position of the computing device 200 by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, and/or beacons.

Figure 3:
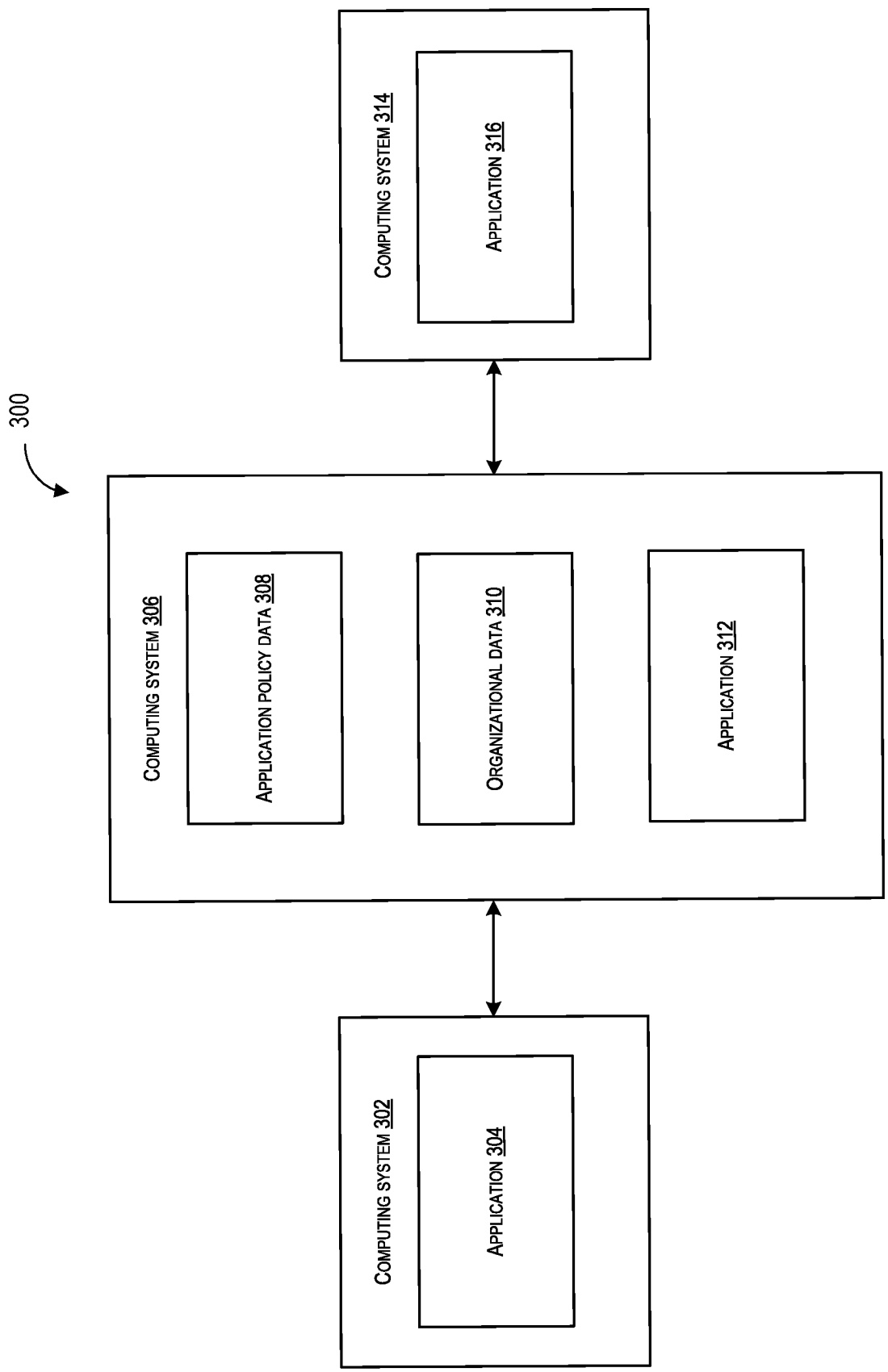
FIG. 3 depicts a block diagram of an example environment including computing systems according to example embodiments of the present disclosure.

FIG. 3 depicts a block diagram of an example environment including computing systems according to example embodiments of the present disclosure. Any of computing system 302, computing system 306, or computing system 314 can include one or more attributes and/or capabilities of the computing system 110, the remote computing system 130, the one or more computing devices 152, and/or the computing device 200. Furthermore, any of the computing system 302, the computing system 306, or the computing system 314 can be configured to perform one or more operations and/or one or more actions that can be performed by the computing system 110, the remote computing system 130, the one or more computing devices 152, and/or the computing device 200.

As shown in FIG. 3, the environment 300 includes the computing system 302, an application 304, the computing system 306, an application policy data 308, organizational data 310, an application 312, a computing system 314, and an application 316.

In this example, the computing system 302, the computing system 306, and/or the computing system 314 can be configured to communicate directly and/or via a communication network (e.g., the network 102 depicted in FIG. 1). In one embodiment, the computing system 302 includes an application 304 that is stored and/or operates on the computing system 302 and can communicate (e.g., send and/or receive data and/or information) with one or more computing systems including the computing system 306 and/or the computing system 314. The application 304 can, for example, include an e-mail application that performs one or more operations on the computing system 302 and includes an e-mail account associated with an organizational record (e.g., an employee record including the name of an employee, an e-mail access identifier, and an e-mail passcode) that is stored as part of the organizational data 310. A user associated with the computing system 306 can, for example, use a portion of the organizational data associated with their employee record to access an e-mail account that is associated with the application 304.

In one embodiment, the computing system 314 includes an application 316 that can perform one or more operations on the computing system 314 and can communicate data and/or information with one or more computing systems including the computing system 302 and/or the computing system 306. The application 316 can, for example, include an employee management application that operates on the computing system 314 and accesses the organizational data 310 which can include one or more organizational records associated with the names of organization employees and the respective employment statuses of the employees (e.g., the employees position or role within the organization and/or an organizational department associated with the employee). A user (e.g., a manager or administrator with the authority to access and/or modify the organizational data 310) associated with the computing system 306 can, for example, access and/or modify the organizational data 310 when an employee changes to a different department or is added to another department in addition to their current department.

The computing system 306 includes the application 312 that can perform one or more operations on the computing system 314 and can communicate data and/or information with one or more computing systems including the computing system 302 and/or the computing system 314. The application 312 can, for example, include an application management application that operates on the computing system 306 and can manage the operation of one or more extra-organizational applications which can include the application 304 and/or the application 316. In some embodiments, the application 312 can include an extra-organizational application that is stored and/or performs operations on the computing system 306. Further, the application 312 can retrieve data and/or information associated with applications external to the computing system 306 (e.g., the computing system 302 and/or the computing system 314). The application 312 can also use (e.g., access, modify, and/or control) the organizational data 310. For example, the application 312 can use the organizational data 310 that is associated with the application 304 to perform one or more operations using the application 316 that is on the computing system 314.

The computing system 306 includes the application policy data 308 which can be implemented on the computing system 306 and can be used to perform one or more operations associated with implementing an application policy associated with the organizational data 310 and/or one or more applications including the application 304, the application 312, and/or the application 316. The application 304, the application 312, and/or the application 316 can include one or more extra-organizational applications that are not affiliated with the organization that manages, owns, and/or controls the organizational data 310 and/or determines or implements an application policy associated with the application policy data 308.

The application policy data 308 can include one or more rules that determine how a plurality of applications including one or more extra-organizational applications are accessed, modified, and/or controlled. For example, the application policy data 308 can use the organizational data 310 that is associated with the application 304 to perform one or more operations on the application 312 and/or the application 316. Furthermore, the application policy data 308 can use the organizational data 310 that is associated with the application 312 to perform one or more operations on the application 304 and/or the application 316. By way of further example, the application policy data 308 can use the organizational data 310 that is associated with the application 316 to perform one or more operations on the application 304 and/or the application 312.

In some embodiments, the application policy data 308 can determine how a combination of one or more organizational applications (applications owned and controlled by an organization that owns and controls the organizational data 310) and/or one or more extra-organizational applications are accessed, modified, and/or controlled.

Figure 4:
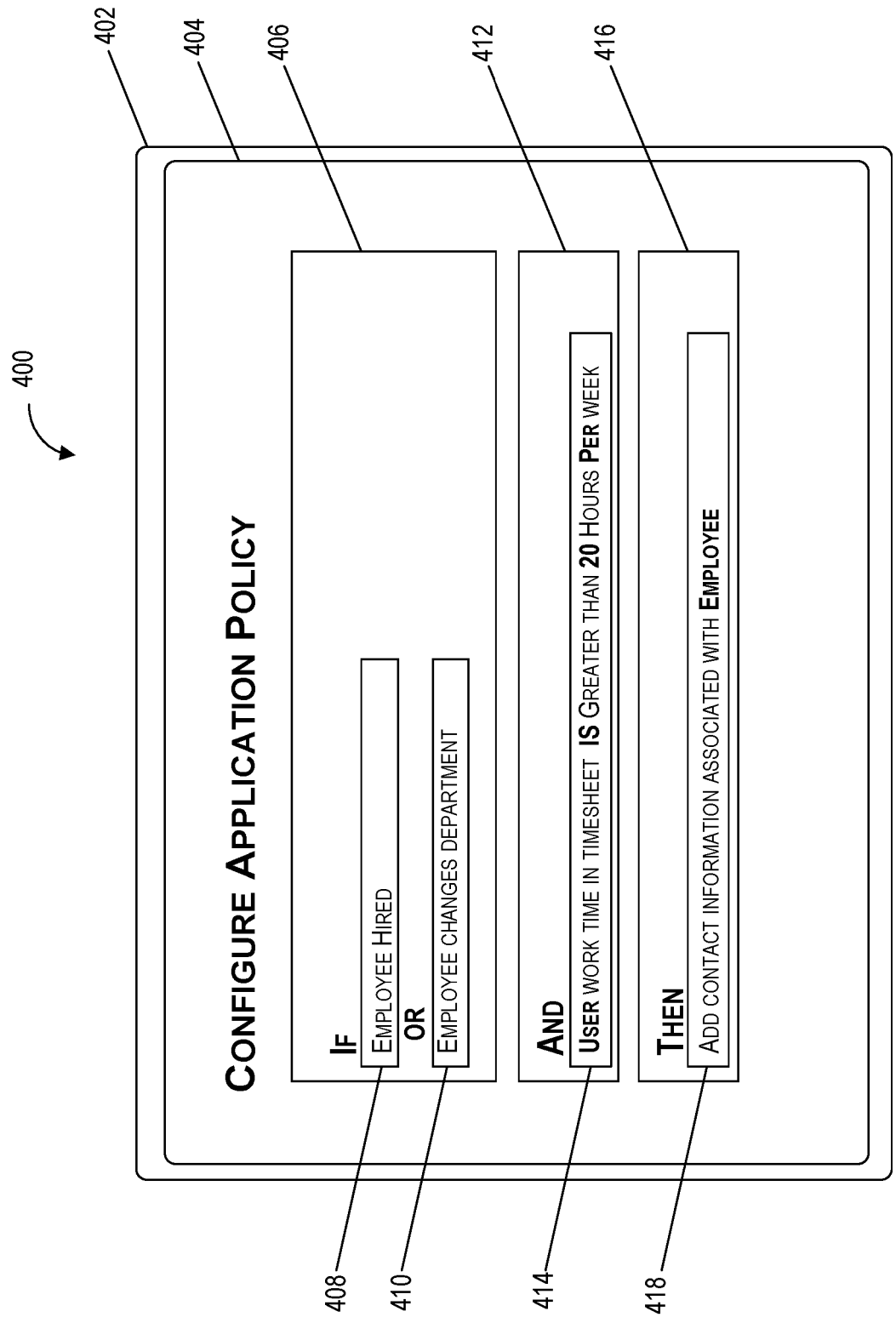
FIG. 4 depicts an example of a user interface for configuring and generating an application policy according to example embodiments of the present disclosure.

FIG. 4 depicts an example of a user interface for configuring and generating an application policy according to example embodiments of the present disclosure. A computing device 400 can include one or more attributes and/or capabilities of the computing system 110, the remote computing system 130, the one or more computing devices 152, and/or the computing device 200. Furthermore, the computing device 400 can be configured to perform one or more operations and/or one or more actions that can be performed by the computing system 110, the remote computing system 130, the one or more computing devices 152, and/or the computing device 200.

As shown in FIG. 4, the computing device 400 includes a display component 402, a user interface 404, an interface element 406, a field 408, a field 410, an interface element 412, a field 414, an interface element 416, and a field 418.

The computing device 400 can be configured to generate output including the user interface 404 (e.g., a graphical user interface) and can be used to display information that may be adjusted based at least in part on one or more user inputs to the user interface 404. Further, the computing device 400 can be configured to generate an application policy based at least in part on the one or more fields and corresponding one or more field values that are provided via the user interface 404.

The user interface 404 includes the interface element 406, the interface element 412, and the interface element 416 which are also displayed on the display component 402. As shown in FIG. 4, the user interface is configured to generate one or more user interface elements and one or more fields that can be used to generate and/or configure an application policy directed to onboarding a newly hired employee of an organization.

The output of the computing device 400 is based at least in part on one or more of application policy data, organizational data, or one or more applications which can include one or more extra-organizational applications. Further, the output of the computing device 400 can be based at least in part on one or more organizational records that can be used as the basis for determining interactions between the application policy data, organizational data, and/or one or more applications which can include one or more extra-organizational applications.

The display component 402 can be configured to detect one or more inputs (e.g., one or more user inputs) that can cause the computing device 400 to perform one or more operations (e.g., operations associated with configuring an application policy). For example, the display component 402 can include a touch-screen (e.g., a capacitive or resistive touch-screen) that is configured to receive and/or detect one or more touch inputs. The one or more touch inputs may be received from a user and may be used by the user to indicate the selection of one or more of the interface elements generated on the user interface 404. Further, the computing device 400 can be configured to receive and/or detect various types of input including audio input (e.g., a user providing a vocal command to select or adjust an interface element), an external input device (e.g., a stylus, a mouse device, or keyboard), or a gesture (e.g., a user gesture that is detected and/or recognized by a camera of the computing device 400). In some embodiments, the computing device 400 can be configured to receive one or more inputs from one or more other computing devices (e.g., a laptop computer, a desktop computer, and/or a smartphone) that communicate with the computing device 400.

The user interface 404 includes the interface element 406, interface element 412, and interface element 416, each of which are associated with receiving an input (e.g., a user input) to configure an application policy. Further, the one or more interface elements associated with and/or displayed by the user interface 404 can be based at least in part on the user of the user interface 404. In this example, the available interface elements and/or fields can be based at least in part on a previous selection by a user to configure an application policy directed to onboarding employees of an organization. Further, different users can be provided with different interface elements and/or different fields based at least in part on the user's identity and/or an authorization level associated with the user. For example, users may be provided with different interface elements and/or fields based at least in part on the one or more applications that are associated with the user. Further, a user with a high authorization level may be provided with interface elements and/or fields that allow the user to configure an application policy for groups of users and/or to access organizational data that is associated with another user.

Any of the interface element 406, interface element 412, and interface element 416 can include one or more fields (e.g., the field 408, the field 410, the field 414, and/or the field 418). The one or more fields can include information that is associated with one or more portions of the organizational data, the application policy data, and/or one or more applications including one or more extra-organizational applications.

Further, the one or more fields can be associated with one or more operators that can include conditional operators and/or logical operators (e.g., IF, AND, OR, NOT). Each of the one or more fields can also be associated with one or more field values. For example, the field 408 could alternatively be associated with the field value "EMPLOYEE TERMINATED" instead of the field value "EMPLOYEE HIRED" that is in the field 408. In some embodiments, the field 408 can include multiple field values to indicate that the "IF" operator is associated with multiple fields. For example, the "IF" operator can be associated with the field values "EMPLOYEE HIRED" "OR" the "EMPLOYEE CHANGES DEPARTMENT" to indicate that either field value being true will satisfy the condition. The one or more operators can be used to form one or more expressions and can be associated with one or more portions of the organizational data, the application policy data, and/or the one or more applications including the one or more extra-organizational applications.

The interface element 406 is associated with a first set of conditions and includes the field 408 which can receive input from a user. For example, a user can select field values associated with the "IF" and "OR" operators from a list (e.g., select a field value from a drop down list) of field values or manually type in the field value (e.g., enter the field value via a pop-up keyboard displayed on the user interface 404 and/or a keyboard that is attached to the computing device 400). For example, the field 408 can be associated with the operator "IF" and a user can select the field value "EMPLOYEE HIRED" to indicate that one part of the condition in the interface element 406 is if an employee is hired. Further, the field 410 can be associated with the operator "OR" and a user can select the field value "EMPLOYEE CHANGES DEPARTMENT" to indicate that the condition associated with the interface element 406 is satisfied if an employee is hired or if an employee changes department (e.g., the employee changes from one department of an organization to another department in the organization).

The interface element 412 is associated with a second set of conditions and includes the field 414 which can receive input from a user. For example, a user can select a field value associated with the "AND" operator from a list (e.g., select a field value from a drop down list) of field values or manually type in the field value (e.g., enter the field value via a pop-up keyboard displayed on the user interface 404 and/or a keyboard that is attached to the computing device 400). The field 414 can be associated with the operator "AND" and a user can enter the field value "USER WORK TIME IN TIMESHEET IS GREATER THAN 20 HOURS PER WEEK" to indicate another condition (in addition to the conditions associated with the interface element 406 that are to be satisfied before the output associated with the interface element 416 will be generated. In particular, the condition associated with the field 414 is that the work time entered in a time sheet associated with a user is greater than 20 hours.

In some embodiments, the field 414 can include one or more field values and/or operators that can be selected by a user to populate the field. For example, the "GREATER THAN" field value can be part of a drop down list of field values that also includes "LESS THAN" or "EQUAL TO." Further, the "20 HOURS" field value can be part of a drop down list of field values that includes a range of hours from "1 HOUR" to "72 HOURS" thereby allowing a user to customize the conditions associated with the interface element 412.

The interface element 416 is associated with an output and/or one or more operations that will be performed if the conditions associated with the interface element 406 and the interface element 412 are satisfied. In this example, satisfaction of the conditions can result in adding contact information associated with the user. For example, the computing device 400 can access the organizational data and determine the one or more organizational records (e.g., e-mail contact list of one or more other employees in the same department as the user) that are associated with the employee. The computing device 400 can then add the contact information (e.g., telephone number and/or e-mail address) associated with the employee to the one or more organizational records that are associated with the employee.

Figure 5:
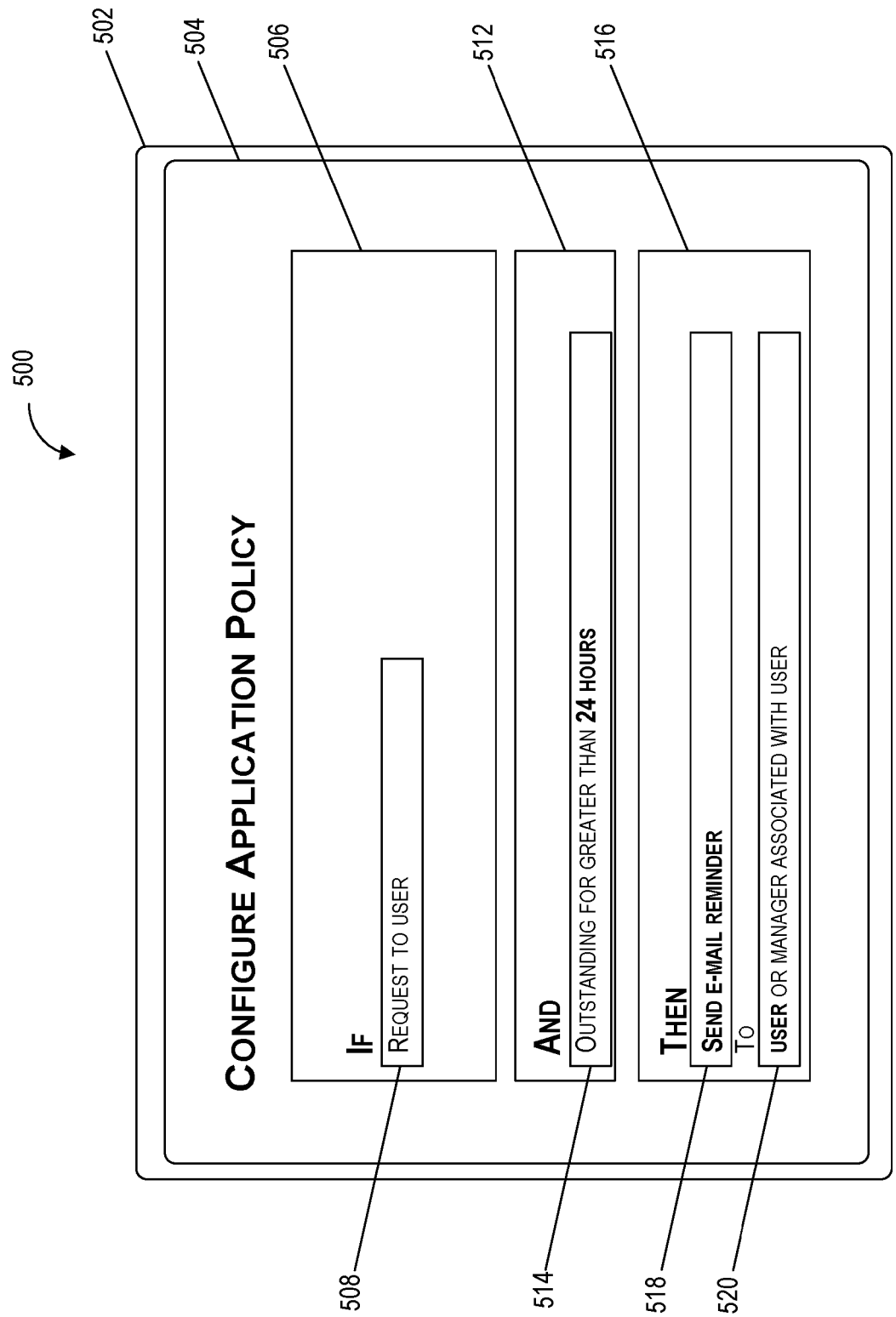
FIG. 5 depicts an example of a user interface for configuring and generating an application policy according to example embodiments of the present disclosure.

FIG. 5 depicts an example of a user interface for configuring and generating an application policy according to example embodiments of the present disclosure. A computing device 500 can include one or more attributes and/or capabilities of the computing system 110, the remote computing system 130, the one or more computing devices 152, and/or the computing device 200. Furthermore, the computing device 500 can be configured to perform one or more operations and/or one or more actions that can be performed by the computing system 110, the remote computing system 150, the one or more computing devices 152, and/or the computing device 200.

As shown in FIG. 5, the computing device 500 includes a display component 502, a user interface 504, an interface element 506, a field 508, an interface element 512, a field 514, an interface element 516, a field 518, and a field 520.

In this example, the computing device 500 is configured to generate output including the user interface 504 (e.g., a graphical user interface) and can be used to display information that may be adjusted based at least in part on one or more user inputs to the user interface 504. Further, the computing device 500 is configured to generate an application policy based on the fields and corresponding field values that are provided via the user interface 504.

The user interface 504 includes the interface element 506, the interface element 512, and the interface element 516 which are also displayed on the display component 502. As shown in FIG. 5, the user interface is configured to generate one or more user interface elements and one or more fields that can be used to generate and/or configure an application policy directed to sending a reminder to a user (e.g., an employee or the employee's manager) when a task (e.g., responding to a request) has been outstanding for some period of time.

The output of the computing device 500 can be based at least in part on one or more of application policy data, organizational data, and/or one or more applications which can include one or more extra-organizational applications. Further, the output of the computing device 500 can be based at least in part on one or more organizational records that can be used as the basis for determining one or more interactions between the application policy data, organizational data, and/or one or more applications which can include one or more extra-organizational applications.

The display component 502 can be configured to detect one or more inputs (e.g., one or more user inputs) that can cause the computing device 500 to perform one or more operations (e.g., operations associated with configuring an application policy). For example, the display component 502 can include a touch-screen (e.g., a capacitive or resistive touch-screen) that is configured to receive and/or detect one or more touch inputs. The one or more touch inputs may be received from a user and may be used by the user to indicate the selection of one or more of the interface elements generated on the user interface 504. Further, the computing device 500 can be configured to receive and/or detect various types of input including audio input (e.g., a user providing a vocal command to select or adjust an interface element), an external input device (e.g., a stylus, a mouse device, or keyboard), or a gesture (e.g., a user gesture that is detected and/or recognized by a camera of the computing device 500). In some embodiments, the computing device 500 can be configured to receive one or more inputs from one or more other computing devices (e.g., a laptop computer, a desktop computer, and/or a smartphone) that communicate with the computing device 500.

The user interface 504 includes the interface element 506, interface element 512, and interface element 516, each of which are associated with receiving an input (e.g., a user input) to configure an application policy. In this example, the available interface elements and/or fields can be based at least in part on a previous selection by a user to configure an application policy directed to sending one or more reminders when a request has been outstanding for some predetermined period of time.

Further, the one or more interface elements associated with and/or displayed by the user interface 504 can be based at least in part on the identity and/or an authorization level associated with the user of the user interface 504. Different users can be provided with different interface elements and/or different fields based at least in part on the user's identity and/or an authorization level associated with the user. For example, users may be provided with different interface elements and/or fields based at least in part on the one or more applications that are associated with the user. Further, a user with a high authorization level may be provided with interface elements and/or fields that allow the user to configure an application policy for groups of users and/or to access organizational data that is associated with another user.

Any of the interface element 506, interface element 512, and interface element 516 can include one or more fields (e.g., the field 508, the field 514, the field 518, and/or the field 520). The one or more fields can include information that is associated with one or more portions of the organizational data, the application policy data, and/or one or more applications including one or more extra-organizational applications.

Further, the one or more fields can be associated with one or more operators that can include conditional operators and/or logical operators (e.g., IF, AND, OR, NOT). Each of the one or more fields can be associated with one or more field values. For example, the field 508 is associated with the field value "REQUEST TO USER" to indicate that the condition is that a user request (e.g., a request for a service that is sent to the user via e-mail) is made. As another example, the field 508 could be associated with another field value to indicate that a different condition is associated with the interface element 506. In some embodiments, the field 508 can include multiple field values to indicate that the "IF" operator is associated with multiple fields. For example, the "IF" operator can be associated with the field values "REQUEST TO USER," (e.g., a request sent to a user) "OR," the "REQUEST FROM USER" (e.g., a request provided by the user) to indicate that either field value being true will satisfy the condition. The one or more operators can be used to form one or more expressions and can be associated with one or more portions of the organizational data, the application policy data, and/or the one or more applications including the one or more extra-organizational applications.

The interface element 506 is associated with a first set of conditions and includes the field 508 which can receive input from a user. For example, a user can select field values associated with the "IF" and "AND" operators from a list (e.g., select a field value from a drop down list) of field values or manually type in the field value (e.g., enter the field value via a pop-up keyboard displayed on the user interface 504 and/or a keyboard that is attached to the computing device 500). For example, the field 508 can be associated with the operator "IF" and a user can select the field value "REQUEST TO USER" to indicate that the condition in the interface element 506 is if a request is sent to the user.

The interface element 512 is associated with a second set of conditions and includes the field 514 which can receive input from a user. For example, a user can select a field value associated with the "AND" operator from a list (e.g., select a field value from a drop down list) of field values or manually type in the field value (e.g., enter the field value via a pop-up keyboard displayed on the user interface 504 and/or a keyboard that is attached to the computing device 500). For example, the field 514 can be associated with the operator "AND" and a user can enter the field value "OUTSTANDING FOR GREATER THAN 24 HOURS" to indicate another condition (in addition to the condition associated with the interface element 506 that is to be satisfied before the outputs associated with the interface element 516 will be generated. In particular, the condition associated with the field 514 is that the request to the user has been outstanding (e.g., the user has not responded to the request) for some predetermined period of time (a period of time greater than twenty-four (24) hours). In some embodiments, the field 514 can include one or more field values and/or operators that can be selected by a user to populate the field. For example, the "GREATER THAN" field value can be part of a drop down list of field values that also includes "LESS THAN" or "EQUAL TO." Further, the "24 HOURS" field value can be part of a drop down list of field values that includes a range of hours from "1 HOUR" to "72 HOURS." In some embodiments, the field value associated with the field 514 can use different units of time including "DAYS" or "WEEKS" thereby allowing a user to customize the conditions associated with the interface element 512.

The interface element 516 is associated with an output and/or one or more operations that will be performed if the conditions associated with the interface element 506 and the interface element 512 are satisfied. In this example, satisfaction of the conditions can result in generating and sending an e-mail reminder to the user or a manager associated with the user. For example, the computing device 500 can access the organizational data and determine the e-mail address that is associated with the user. Further, the computing device 500 can use relationships inferred from the organizational data to determine the user's manager and the e-mail address associated with the user's manager. The computing device 500 can then generate an e-mail reminder message and send the e-mail reminder message to the user and/or the user's manager.

Figure 6:
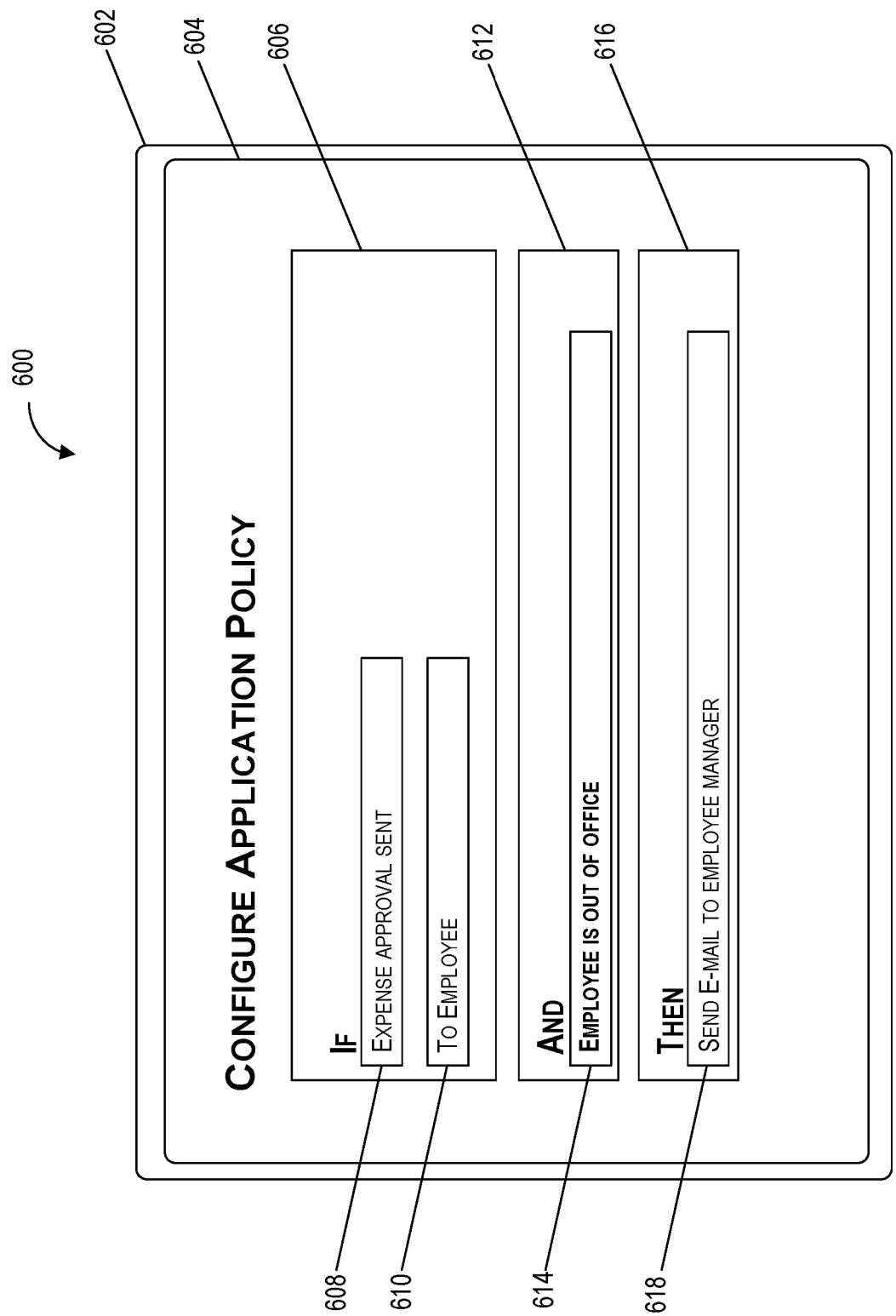
FIG. 6 depicts an example of a user interface for configuring and generating an application policy according to example embodiments of the present disclosure.

FIG. 6 depicts an example of a user interface for configuring and generating an application policy according to example embodiments of the present disclosure. A computing device 600 can include one or more attributes and/or capabilities of the computing system 110, the remote computing system 130, the one or more computing devices 152, and/or the computing device 200. Furthermore, the computing device 600 can be configured to perform one or more operations and/or one or more actions that can be performed by the computing system 110, the remote computing system 150, the one or more computing devices 152, and/or the computing device 200.

As shown in FIG. 6, the computing device 600 includes a display component 602, a user interface 604, an interface element 606, a field 608, a field 610, an interface element 612, a field 614, an interface element 616, and a field 618.

In this example, the computing device 600 is configured to generate output including the user interface 604 (e.g., a graphical user interface) and can be used to display information that may be adjusted based at least in part on one or more user inputs to the user interface 604. Further, the computing device 600 is configured to generate an application policy based on the fields and corresponding field values that are provided via the user interface 604.

The user interface 604 includes the interface element 606, the interface element 612, and the interface element 616 which are also displayed on the display component 602. As shown in FIG. 6, the user interface is configured to generate one or more user interface elements and one or more fields that can be used to generate and/or configure an application policy directed to sending an e-mail to a manager when an expense approval has been sent to an employee that is out of the office (e.g., on vacation).

The output of the computing device 600 is based at least in part on one or more of application policy data, organizational data, or one or more applications which can include one or more extra-organizational applications. Further, the output of the computing device 600 can be based at least in part on one or more organizational records that can be used as the basis for determining interactions between the application policy data, organizational data, and/or one or more applications which can include one or more extra-organizational applications.

The display component 602 can be configured to detect one or more inputs (e.g., one or more user inputs) that can cause the computing device 600 to perform one or more operations (e.g., operations associated with configuring an application policy). For example, the display component 602 can include a touch-screen (e.g., a capacitive or resistive touch-screen) that is configured to receive and/or detect one or more touch inputs. The one or more touch inputs may be received from a user and may be used by the user to indicate the selection of one or more of the interface elements generated on the user interface 604. Further, the computing device 600 can be configured to receive and/or detect various types of input including audio input (e.g., a user providing a vocal command to select or adjust an interface element), an external input device (e.g., a stylus, a mouse device, or keyboard), or a gesture (e.g., a user gesture that is detected and/or recognized by a camera of the computing device 600). In some embodiments, the computing device 600 can be configured to receive one or more inputs from one or more other computing devices (e.g., a laptop computer, a desktop computer, and/or a smartphone) that communicate with the computing device 600.

The user interface 604 includes the interface element 606, interface element 612, and interface element 616, each of which are associated with receiving an input (e.g., a user input) to configure an application policy. In this example, the available interface elements and/or fields can be based at least in part on a previous selection by a user to configure an application policy directed to sending an e-mail to a manager when an employee is out of the office.

Further, the one or more interface elements associated with and/or displayed by the user interface 604 can be based at least in part on the user of the user interface 604. Different users can be provided with different interface elements and/or different fields based at least in part on the user's identity and/or an authorization level associated with the user of the user interface 604. For example, users may be provided with different interface elements and/or fields based at least in part on the one or more applications that are associated with the user. Further, a user with a high authorization level may be provided with interface elements and/or fields that allow the user to configure an application policy for groups of users and/or to access organizational data that is associated with another user.

Any of the interface element 606, interface element 612, and interface element 616 can include one or more fields (e.g., the field 608, the field 610, the field 614, and/or the field 618). The one or more fields can include information that is associated with one or more portions of the organizational data, the application policy data, and/or one or more applications including one or more extra-organizational applications.

Further, the one or more fields can be associated with one or more operators that can include conditional operators and/or logical operators (e.g., IF, AND, OR, NOT). Each of the one or more fields can be associated with one or more field values. For example, the field 608 can be associated with the field value "EXPENSE APPROVAL RECEIVED" instead of the field value "EMPLOYEE APPROVAL SENT" to indicate that a different condition is associated with the interface element 606. In some embodiments, the field 608 can include multiple field values to indicate that the "IF" operator is associated with one or more additional fields. For example, the "IF" operator can be associated with the field value "TO" and the field value "EMPLOYEE" to indicate additional conditions associated with the "IF" operator. The one or more operators can be used to form one or more expressions and can be associated with one or more portions of the organizational data, the application policy data, and/or the one or more applications including the one or more extra-organizational applications.

The interface element 606 is associated with a first set of conditions and includes the field 608 which can receive input from a user. For example, a user can select field values associated with the "IF" and "AND" operators from a list (e.g., select a field value from a drop down list) of field values or manually type in the field value (e.g., enter the field value via a pop-up keyboard displayed on the user interface 604 and/or a keyboard that is attached to the computing device 600). For example, the field 608 can be associated with the operator "IF" and a user can select the field value "EXPENSE APPROVAL SENT" to indicate that one part of the condition in the interface element 606 is if an employee approval is sent. Further, the field 610 can be associated with the field value "TO EMPLOYEE" to indicate that the condition associated with the interface element 606 is satisfied if an expense approval is sent to an employee.

The interface element 612 is associated with a second set of conditions and includes the field 614 which can receive input from a user. For example, a user can select a field value associated with the "AND" operator from a list (e.g., select a field value from a drop down list) of field values or manually type in the field value (e.g., enter the field value via a pop-up keyboard displayed on the user interface 604 and/or a keyboard that is attached to the computing device 600). For example, the field 614 can be associated with the operator "AND" and a user can select the field value "EMPLOYEE IS OUT OF OFFICE" to indicate another condition (in addition to the conditions associated with the interface element 606) that has to be satisfied before the output associated with the interface element 616 will be generated. In particular, the condition associated with the field 614 is that the employee is out of office. For example, the computing device 600 can access the organizational data and access one or more organizational records associated with the calendar and/or schedule of the employee to determine if the employee scheduled time out of the office (e.g., a vacation) during the current time.

The interface element 616 is associated with an output and/or one or more operations that will be performed if the conditions associated with the interface element 606 and the interface element 612 are satisfied. In this example, satisfaction of the conditions can result in adding contact information associated with the user. For example, the computing device 600 can access the organizational data and determine the one or more organizational records (e.g., e-mail addresses associated with the user and/or one or more of the user's managers) associated with the employee. The computing device 600 can then generate an e-mail associated with the expense approval and send the e-mail to the employee's manager.

Figure 7:
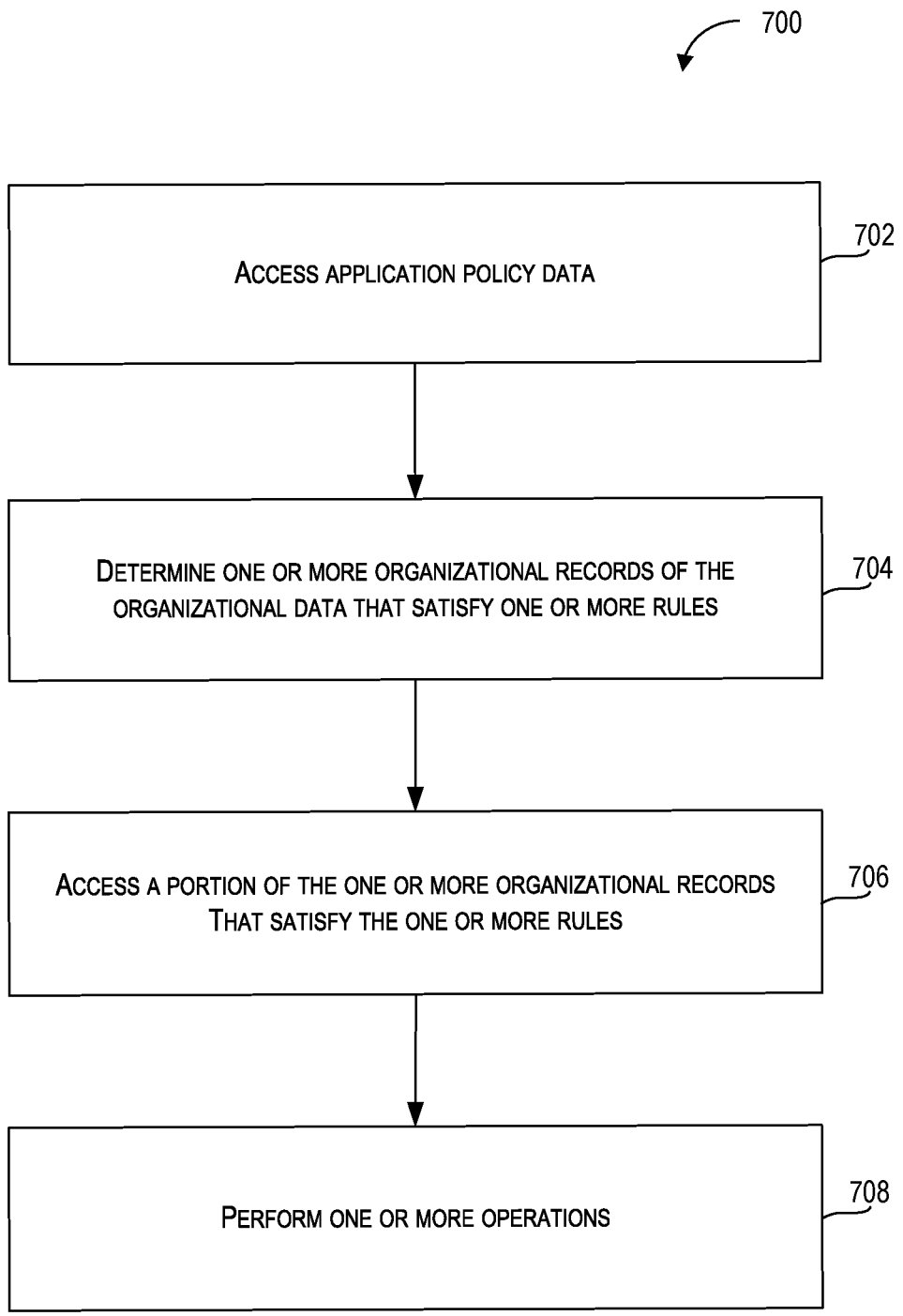
FIG. 7 depicts a flow diagram of configuring and implementing application policies according to example embodiments of the present disclosure.

FIG. 7 depicts a flow diagram of configuring and implementing application policies according to example embodiments of the present disclosure. One or more portions of the method 700 can be executed and/or implemented on one or more computing devices or computing systems including, for example, the computing system 110, the remote computing system 130, the one or more computing devices 152, and/or the computing device 200. Further, one or more portions of the method 700 can be executed or implemented as an algorithm on the hardware devices or systems disclosed herein. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 702, the method 700 can include accessing application policy data associated with implementing an application policy. The application policy data can include one or more rules associated with implementing the application policy by using organizational data associated with a plurality of applications including a set of one or more extra-organizational applications that perform one or more operations associated with a different set of one or more extra-organizational applications. For example, the computing system 110 can access application policy data that can include rules associated with generating and sending messages (e.g., text messages) to an employee's telephone (e.g., smartphone) fifteen (15) minutes before the employee's scheduled meeting with another employee. Organizational data that is referenced by the application policy data can be based at least in part on information from different sets of extra-organizational applications can include the employee's appointment and telephone number.

At 704, the method 700 can include determining, based at least in part on the application policy data, one or more organizational records of the organizational data that satisfy the one or more rules. For example, the computing system 110 can analyze the organizational records to determine the one or more organizational records of the organizational data that satisfy the one or more rules. By way of further example, if the application policy data includes a rule indicating that a newly hired employee will be sent a welcome e-mail message, the computing system 110 will determine that the one or more organizational records associated with a newly hired employee satisfy the one or more rules, and that the employees that have been with an organization for years do not satisfy the one or more rules.

At 706, the method 700 can include accessing the plurality of applications associated with the one or more organizational records that satisfy the one or more rules. For example, after the computing system 110 determines that the plurality of applications associated with the one or more organizational records that satisfy the one or more rules (e.g., a rule constraining to one or more organizational records associated with sending a reminder message to log time e-mail to employees of an organization) include a time-keeping application and a messaging application, the computing system 110 can access the time-keeping application that stores the number of hours that each employee of an organization has worked and also access the messaging application that can be used to communicate the reminder message to the relevant employees of the organization.

At 708, the method 700 can include performing, based at least in part on the application policy and the one or more organizational records, the one or more operations associated with implementing the application policy. For example, the computing system 110 can implement the application policy by sending an e-mail message in accordance with the one or more rules associated with the application policy data (e.g., sending a welcome e-mail to a new employee).

Figure 8:
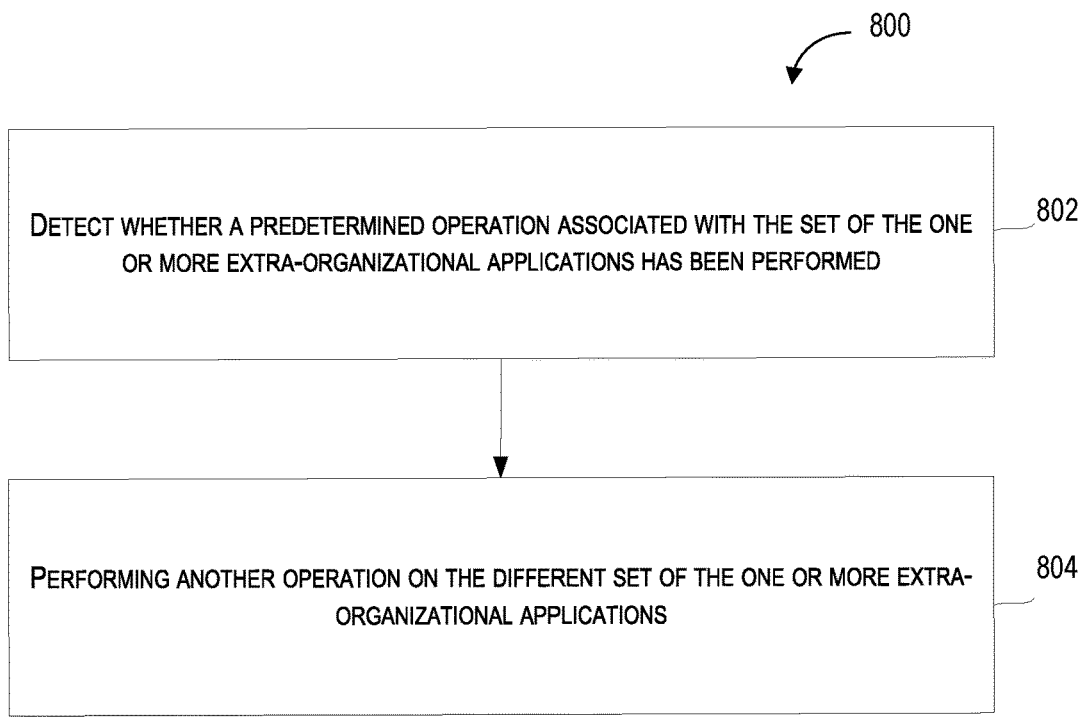
FIG. 8 depicts a flow diagram of configuring and implementing application policies according to example embodiments of the present disclosure.

FIG. 8 depicts a flow diagram of configuring and implementing application policies according to example embodiments of the present disclosure. One or more portions of the method 800 can be executed and/or implemented on one or more computing devices and/or computing systems including, for example, the computing system 110, the remote computing system 130, the one or more computing devices 152, and/or the computing device 200. Further, one or more portions of the method 800 can be executed or implemented as an algorithm on the hardware devices or systems disclosed herein. FIG. 8 depicts steps performed in a particular order for purposes of illustration and discussion. In some embodiments, one or more portions of the method 800 can be performed as part of the method 700 that is depicted in FIG. 7. Those of ordinary skill in the art, using the disclosures provided herein, will understand that various steps of any of the methods disclosed herein can be adapted, modified, rearranged, omitted, and/or expanded without deviating from the scope of the present disclosure.

At 802, the method 800 can include detecting whether and/or when a predetermined operation associated with the set of one or more extra-organizational applications has been or is being performed. For example, the computing system 110 can detect one or more communications and/or one or more calls by the one or more extra-organizational applications. By way of further example, the set of one or more extra-organizational applications may cause the organizational data to change, and the computing system 110 may detect the one or more changes in the organizational data and determine that the one or more extra-organizational applications have performed some predetermined operation (e.g., sending a text message to an employee).

At 804, the method 800 can include performing another operation on the different set of one or more extra-organizational applications. For example, in response to detecting the performance of the predetermined operation (e.g., sending a message to an employee) associated with the set of one or more extra-organizational applications, the computing system 110 can use a different set of one or more extra-organizational applications to send an e-mail to a manager of the employee.

Figure 9:
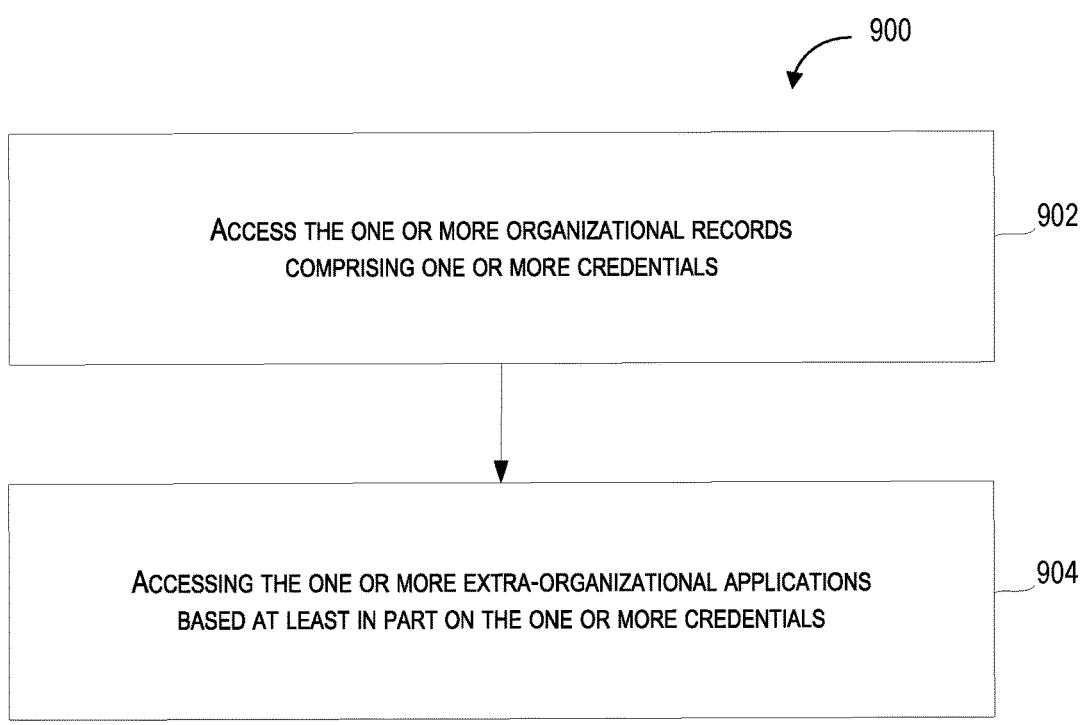
FIG. 9 depicts a flow diagram of configuring and implementing application policies according to example embodiments of the present disclosure.

FIG. 9 depicts a flow diagram of configuring and implementing application policies according to example embodiments of the present disclosure. One or more portions of the method 900 can be executed and/or implemented on one or more computing devices and/or computing systems including, for example, the computing system 110, the remote computing system 130, the one or more computing devices 152, and/or the computing device 200. Further, one or more portions of the method 900 can be executed or implemented as an algorithm on the hardware devices or systems disclosed herein. FIG. 9 depicts steps performed in a particular order for purposes of illustration and discussion. In some embodiments, one or more portions of the method 900 can be performed as part of the method 700 that is depicted in FIG. 7. Those of ordinary skill in the art, using the disclosures provided herein, will understand that various steps of any of the methods disclosed herein can be adapted, modified, rearranged, omitted, and/or expanded without deviating from the scope of the present disclosure.

At 902, the method 900 can include accessing the one or more organizational records comprising the one or more credentials. The computing system 110 can access organizational data and/or the one or more organizational records that include information associated with one or more credentials including a user/employee name, a passcode, and an associated application (e.g., an extra-organizational application).

At 904, the method 900 can include accessing the one or more extra-organizational applications based at least in part on the one or more credentials. For example, using the one or more credentials, the computing system 110 can access a work management application and determine that the associated user/employee is approaching a due date for an application. The computing system 110 can then access a different application to generate a message and send the message to the user/employee's manager to notify the manager of the approaching due date.

Figure 10:
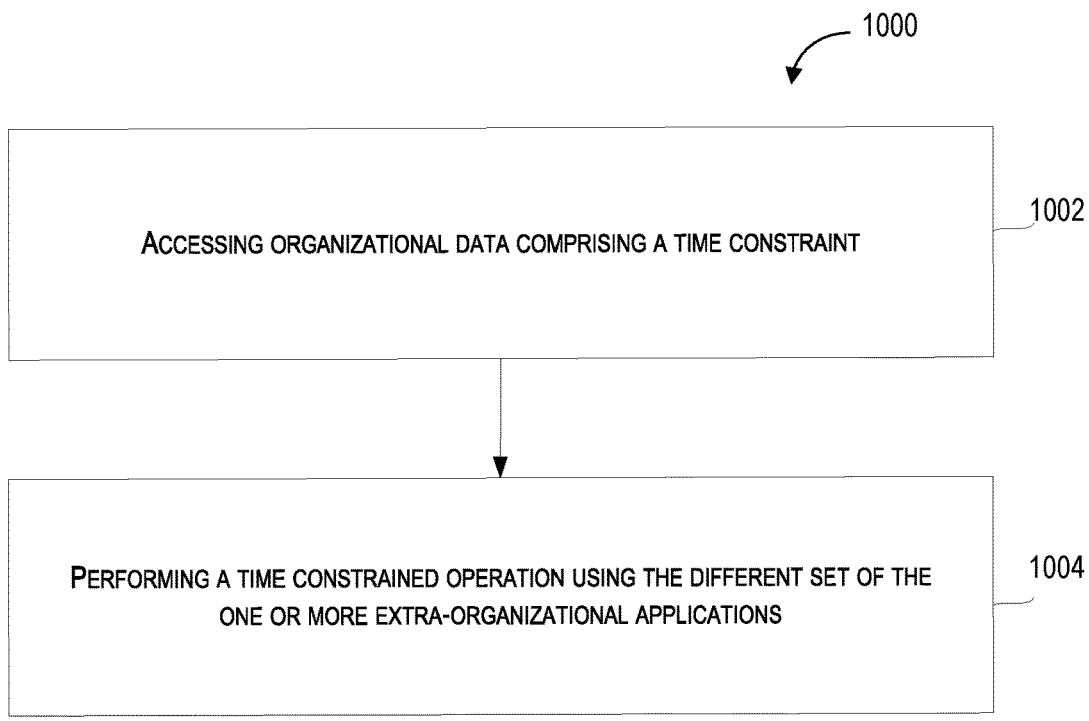
FIG. 10 depicts a flow diagram of configuring and implementing application policies according to example embodiments of the present disclosure.

FIG. 10 depicts a flow diagram of configuring and implementing application policies according to example embodiments of the present disclosure. One or more portions of the method 1000 can be executed and/or implemented on one or more computing devices and/or computing systems including, for example, the computing system 110, the remote computing system 130, the one or more computing devices 152, and/or the computing device 200. Further, one or more portions of the method 1000 can be executed or implemented as an algorithm on the hardware devices or systems disclosed herein. FIG. 10 depicts steps performed in a particular order for purposes of illustration and discussion. In some embodiments, one or more portions of the method 1000 can be performed as part of the method 700 that is depicted in FIG. 7. Those of ordinary skill in the art, using the disclosures provided herein, will understand that various steps of any of the methods disclosed herein can be adapted, modified, rearranged, omitted, and/or expanded without deviating from the scope of the present disclosure.

At 1002, the method 1000 can include accessing the application policy data including a time constraint. For example, the computing system 110 can access the application data including one or more rules that establish a time constraint on a user sending a new version of source code to an extra-organizational version control application.

At 1004, the method 1000 can include performing the time constrained operation using the different set of one or more extra-organizational applications. For example, the computing system 110 can send a user a reminder when a predetermined period of time associated with the time constraint (e.g., the period of time before sending a new version of source code to the version control application) has elapsed.

Figure 11:
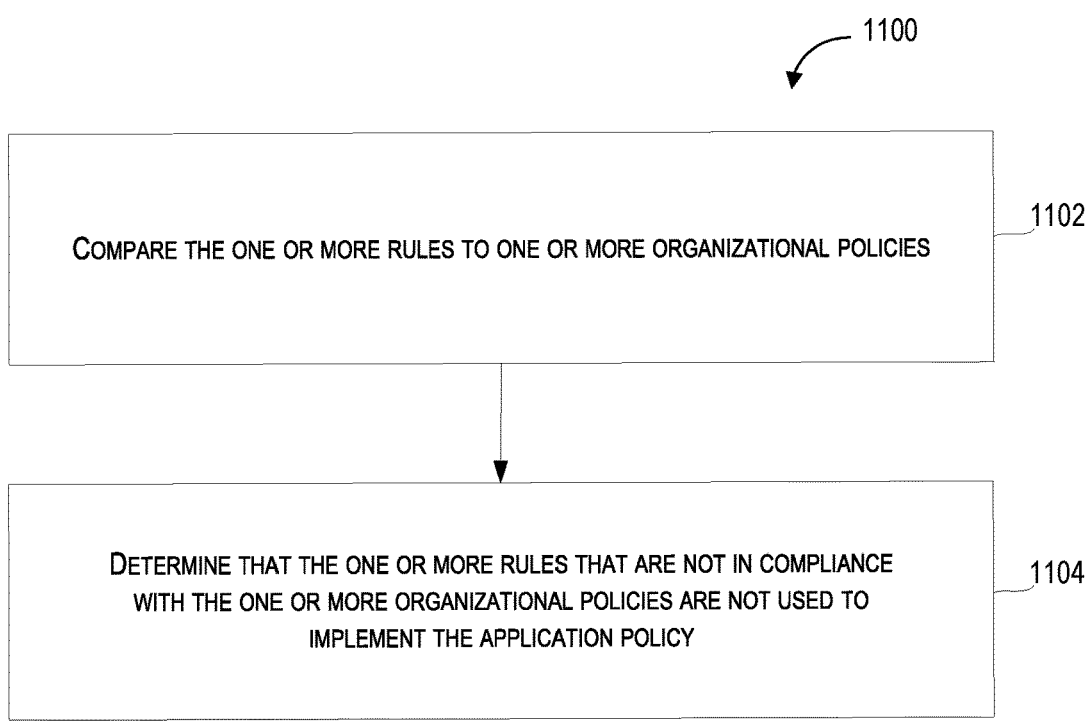
FIG. 11 depicts a flow diagram of configuring and implementing application policies according to example embodiments of the present disclosure.

FIG. 11 depicts a flow diagram of configuring and implementing application policies according to example embodiments of the present disclosure. One or more portions of the method 1100 can be executed and/or implemented on one or more computing devices and/or computing systems including, for example, the computing system 110, the remote computing system 130, the one or more computing devices 152, and/or the computing device 200. Further, one or more portions of the method 1100 can be executed or implemented as an algorithm on the hardware devices or systems disclosed herein. FIG. 11 depicts steps performed in a particular order for purposes of illustration and discussion. In some embodiments, one or more portions of the method 1100 can be performed as part of the method 700 that is depicted in FIG. 7. Those of ordinary skill in the art, using the disclosures provided herein, will understand that various steps of any of the methods disclosed herein can be adapted, modified, rearranged, omitted, and/or expanded without deviating from the scope of the present disclosure.

At 1102, the method 1100 can include comparing the one or more rules to one or more organizational policies associated with the organizational data. The computing system 110 can access the application policy data and/or the organizational data associated with each of the one or rules. The computing system 110 can then compare each of the one or more rules to the one or more organizational policies to determine whether each rule is in compliance with each of the one or more organizational policies.

At 1104, the method 1100 can include determining that the one or more rules that are not in compliance with the one or more organizational policies are not used to implement the application policy. For example, based at least in part on the comparison of the one or more rules to the one or more policies, the computing system 110 can determine that the one or more rules that are not in compliance with the one or more organizational policies (e.g., a rule that requires access to an application that is not permitted by the one or more organizational policies) will not be part of the application policy.

Figure 12:
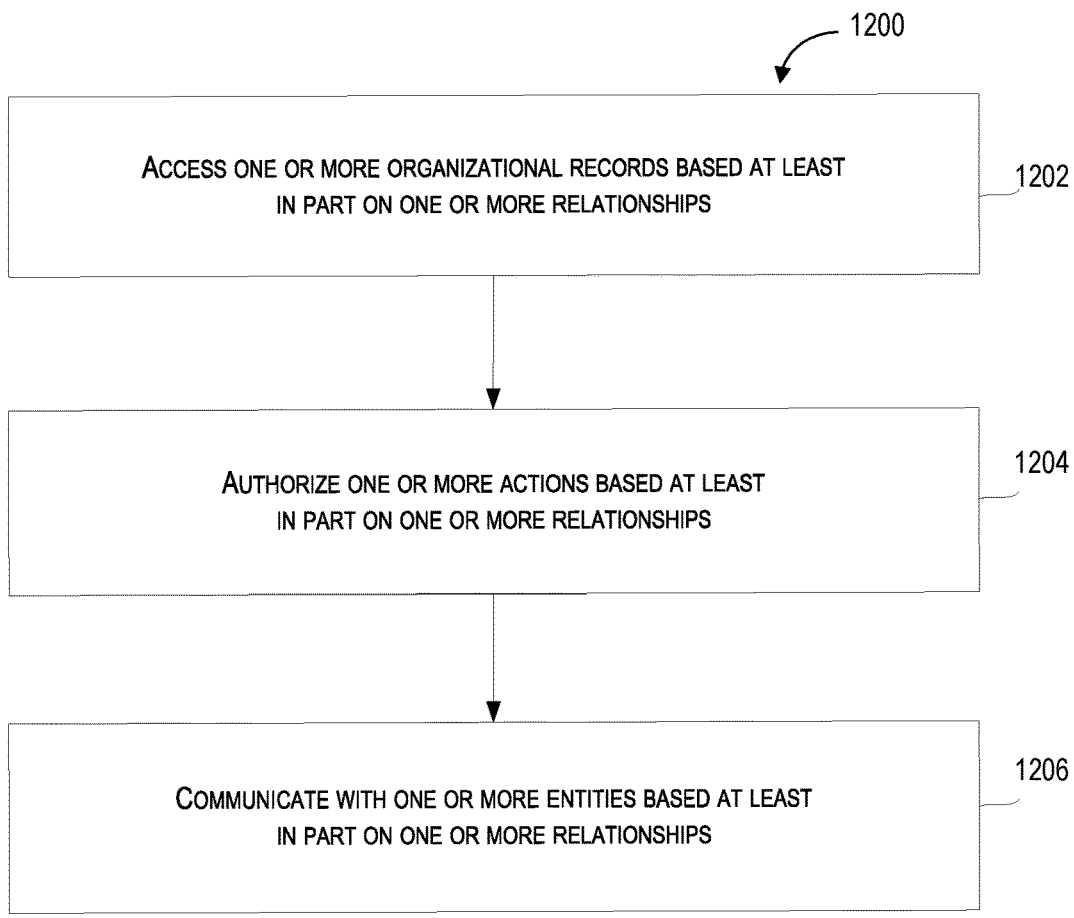
FIG. 12 depicts a flow diagram of configuring and implementing application policies according to example embodiments of the present disclosure.

FIG. 12 depicts a flow diagram of configuring and implementing application policies according to example embodiments of the present disclosure. One or more portions of the method 1200 can be executed and/or implemented on one or more computing devices and/or computing systems including, for example, the computing system 110, the remote computing system 130, the one or more computing devices 152, and/or the computing device 200. Further, one or more portions of the method 1200 can be executed or implemented as an algorithm on the hardware devices or systems disclosed herein. FIG. 12 depicts steps performed in a particular order for purposes of illustration and discussion. In some embodiments, one or more portions of the method 1200 can be performed as part of the method 700 that is depicted in FIG. 7. Those of ordinary skill in the art, using the disclosures provided herein, will understand that various steps of any of the methods disclosed herein can be adapted, modified, rearranged, omitted, and/or expanded without deviating from the scope of the present disclosure.

At 1202, the method 1200 can include accessing the one or more organizational records based at least in part on the one or more relationships. For example, the computing system 110 can access relationship information associated with an organizational team's membership and team leader to send e-mail messages to access the one or more organizational records associated with the organizational team's performance metrics.

At 1204, the method 1200 can include authorizing one or more actions associated with the one or more extra-organizational applications based at least in part on the one or more relationships. For example, the computing system 110 can access relationship information associated with an organizational team's membership and team leader. The computing system 110 can then authorize the team's leader and select team members to access one or more applications.

At 1206, the method 1200 can include communicating, by the computing system, with one or more entities associated with the one or more organizational records based at least in part on the one or more relationships. For example, the computing system 110 can access relationship information associated with an organizational team's membership and team leader to send e-mail messages to the one or more organizational records associated with a team of employees that are managed by a team leader.

Figure 13:
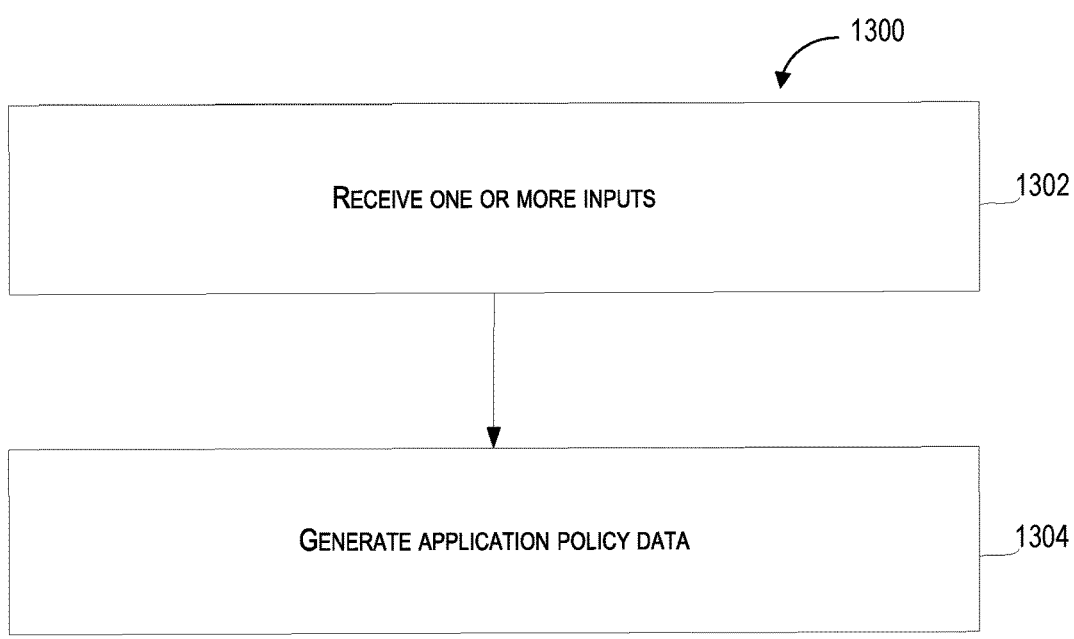
FIG. 13 depicts a flow diagram of configuring and implementing application policies according to example embodiments of the present disclosure.

FIG. 13 depicts a flow diagram of configuring and implementing application policies according to example embodiments of the present disclosure. One or more portions of the method 1300 can be executed and/or implemented on one or more computing devices and/or computing systems including, for example, the computing system 110, the remote computing system 130, the one or more computing devices 152, and/or the computing device 200. Further, one or more portions of the method 1300 can be executed or implemented as an algorithm on the hardware devices or systems disclosed herein. FIG. 13 depicts steps performed in a particular order for purposes of illustration and discussion. In some embodiments, one or more portions of the method 1300 can be performed as part of the method 700 that is depicted in FIG. 7. Those of ordinary skill in the art, using the disclosures provided herein, will understand that various steps of any of the methods disclosed herein can be adapted, modified, rearranged, omitted, and/or expanded without deviating from the scope of the present disclosure.

At 1302, the method 1300 can include receiving one or more inputs via a graphical user interface configured to display one or more policy options associated with the application policy. For example, a graphical user interface generated by the computing system 110 can be configured to receive and/or detect one or more inputs including one or more touch inputs from a user. The one or more policy options of the graphical user interface can be associated with one or more interface elements and/or one or fields that can be used to generate and/or configure application policy data. Further, the one or more inputs can be associated with generating and/or configuring one or more rules.

At 1304, the method 1300 can include generating the application policy data based at least in part on the one or more user inputs. For example, the computing system 110 can use the one or more rules that were generated and/or configured based at least in part on the one or more inputs can be used as the basis for generating the application policy data. For example, the application policy data can include one or more user names, one or more extra-organizational applications, and/or one or rules to implement an application policy.

Numerous details are set forth in the foregoing description. However, it will be apparent to one of ordinary skill in the art having the benefit of this disclosure that the present disclosure may be practiced without these specific details. In some instances, structures and devices are shown in block diagram form, rather than in detail, to avoid obscuring the present disclosure.

Some portions of the detailed description have been presented in terms of processes and symbolic representations of operations on data bits within a computer memory. Here, a process can include a self-consistent sequence of steps leading to a result. The steps can include those requiring physical manipulations of physical quantities. These quantities can take the form of electrical or magnetic signals capable of being stored, transferred, combined, compared, and otherwise manipulated. These signals can be referred to as bits, values, elements, symbols, characters, terms, numbers, or the like.

These terms and similar terms can be associated with physical quantities and can represent labels applied to these quantities. The terms including "analyzing," "accessing," "determining," "identifying," "adjusting," "modifying," "transmitting," "receiving," "processing" "generating," or the like, can refer to the actions and processes of a computer system, a computing device, or similar electronic computing device, that manipulates and transforms data represented as physical (e.g., electronic) quantities within the computer system's registers and memories into other data that can be similarly represented as physical quantities within the computer system's memories, registers, or other information storage device, data transmission device, or data processing device.

Certain examples of the present disclosure can relate to an apparatus for performing the operations described herein. This apparatus may include a computing device that is activated or reconfigured by a computer program comprising electronic instructions stored in the computing device. Such a computer program may be stored in a computer readable storage medium, which can include any type of storage. For example, the storage can include hard disk drives, solid state drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The above description is intended to be illustrative, and not restrictive. The scope of the disclosure can therefore be determined with reference to the claims.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments.

Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system configured to automatically cause actions in linked organizational management third-party applications based on data collected from other third-party applications, the computing system comprising:
   one or more processors; and
   one or more non-transitory computer-readable media that store:
      organizational data having a graph comprising of a plurality of employee data objects, wherein the graph defines relationships among the employee data objects; and
      one or more sets of computer-readable instructions that, when executed by the one or more processors, cause the computing system to perform operations to implement an organizational management platform in communication over a communications network with a plurality of third-party software applications, the operations comprising:
         receiving, over the communications network, first software application data from a first third-party software application of the plurality of third-party software applications, wherein the first software application data is descriptive of an update to data stored in the first software third-party application, and wherein the plurality of software third-party applications comprises at least one of: (i) a time entry and management application, (ii) an instant messaging application among employees, (iii) an information technology management application, (iv) an accounting application, (v) a workflow management application, (vi) an email application, or (vii) an employee management application;
         accessing an application policy associated with a second third-party software application of the plurality of third-party software applications, the application policy comprises a user-defined query, and wherein the application policy associated with the second third-party software application describes how the update to data stored in the first third-party software application causes an action to be performed in the second third-party application;
         evaluating the application policy associated with the second third-party software application based at least in part on the update to the data stored in the first third-party software application and based at least in part on the graph to determine one or more operations associated with implementing the application policy, wherein the one or more operations associated with implementing the application policy comprise causing an action to be performed to an account in the second third-party software application based on the first software application data, and wherein evaluating the application policy comprises executing the user-defined query relative to the graph to determine an employee object for which the action is to betaken in the second third-party software application, the account being associated with the employee object; and
         communicating, using the communications network, with the second third-party application automatically causing the action to be performed to the account associated with the determined employee object in the second third-party software application.

2. The computing system of claim 1, wherein the application policy comprises a user-defined application policy defined by an administrator of the organizational management platform.

3. The computing system of claim 2, wherein the user-defined application policy comprises a user-defined query expressed in a domain-specific query language, and wherein evaluating the application policy comprises executing the user-defined query relative to the organizational data.

4. The computing system of claim 1, wherein the first third-party application is a time and attendance application, and wherein the second third-party application is an electronic mail application, the operations further comprising:

causing an account to be created for an employee within the electronic mail application based on the employee logging a threshold amount of time in the time and attendance application.

5. The computing system of claim 1, wherein the first third-party application is a software development application, and wherein the second third-party application is an electronic mail application, the operations further comprising:
   identifying a user that is responsible for a task in the software development application that is pending for longer than a threshold time period;
   examining, using the organizational data, an employee record of a user to identify a manager; and
   communicating with the electronic mail application to send an alert to the manager.

6. The computing system of claim 1, wherein the first third-party application is an expense management application, and wherein the second third-party application is a time and attendance application, the operations further comprising:
   receiving, from the expense management application, an expense approval request that is directed to a first user;
   identifying, using the time and attendance application, that the first user is currently on paid time off;
   evaluating, using the organizational data, an employee record of a user to identify a manager; and
   rerouting, in the expense management application, the expense approval request to the manager.

7. The computing system of claim 1, wherein evaluating the application policy comprises executing in real-time the user-defined query relative to the graph.

8. A computer-implemented method of implementing an organizational management application policy, the computer-implemented method comprising:
   accessing, by a computing system comprising one or more processors, organizational data having a graph comprising of a plurality of employee data objects, wherein the graph defines relationships among the employee data objects;
   receiving, over a communications network, first software application data from a first third-party software application of a plurality of applications, wherein the first software application data is descriptive of an update to data stored in the first software third-party application;
   accessing, by the computing system, application policy data associated with implementing an application policy, wherein the application policy data comprises one or more rules associated with implementing the application policy by using the organizational data associated with the plurality of applications, wherein the application policy comprises a user-defined query, wherein the application policy associated with a second third-party software application describes how the update to data stored in the first third-party software application causes an action to be performed to an account in the second third-party application, and wherein the plurality of applications comprises at least one of: (i) a time entry and management application, (ii) an instant messaging application among employees, (iii) an information technology management application, (iv) an accounting application, (v) a workflow management application, (vi) an email application, or (vii) an employee management application;
   determining, by the computing system, based at least in part on the application policy data, and the graph, one or more organizational records of the organizational data that satisfy the one or more rules, wherein one or more of the organizational records is descriptive of an update to data stored in the first third-party application;
   accessing, by the computing system, the plurality of applications associated with the one or more organizational records that satisfy the one or more rules;
   automatically performing, by the computing system over a communications network, based at least in part on the application policy and the one or more organizational records, the one or more operations associated with implementing the application policy and the one or more satisfied rules, wherein the one or more operations includes executing the user-defined query relative to the graph to determine an employee object for which an action is to be taken in the second third-party application, the employee object being associated with the account; and
   communicating by the computer system over the communications network, to the second third-party application, automatically causing the action to be taken on the account associated with the determined employee object in the second third-party software application.

9. The computer-implemented method of claim 8, wherein the performing, by the computing system, based at least in part on the application policy and the one or more organizational records, the one or more operations associated with implementing the application policy comprises:
   detecting, by the computing system, whether a predetermined operation associated with the first third-party software application has been performed, the predetermined operation being associated with a threshold time period; and
   in response to detecting the predetermined operation, sending, by the computing system, an alert on the second third-party software application.

10. The computer-implemented method of claim 8, wherein the one or more organizational records comprise one or more credentials used to access a portion of the one or more extra-organizational applications, and wherein the performing, by the computing system, based at least in part on the application policy and the one or more organizational records, the one or more operations associated with implementing the application policy comprises:
   accessing, by the computing system, the one or more organizational records comprising the one or more credentials; and
   accessing, by the computing system, the one or more extra-organizational applications based at least in part on the one or more credentials.

11. The computer-implemented method of claim 8, wherein the application policy data comprises a time constraint for a time constrained operation associated with the plurality of applications, and wherein the performing, by the computing system, based at least in part on the application policy and the one or more organizational records, the one or more operations associated with implementing the application policy comprises:
   accessing, by the computing system, the application policy data comprising the time constraint;
   performing, by the computing system, the time constrained operation using the plurality of applications.

12. The computer-implemented method of claim 11, wherein the time constraint comprises a threshold amount of time before which the time constrained operation is due to be performed.

13. The computer-implemented method of claim 11, wherein the time constraint comprises a threshold amount of time after which the time constrained operation is due to be performed.

14. The computer-implemented method of claim 11, wherein the organizational data comprises information associated with one or more relationships between the one or more organizational records, and wherein the application policy limits the one or more operations based at least in part on the one or more relationships.

15. The computer-implemented method of claim 14, wherein the performing, by the computing system, based at least in part on the application policy and the one or more organizational records, the one or more operations associated with implementing the application policy comprise:
   accessing, by the computing system, the one or more organizational records based at least in part on the one or more relationships;
   authorizing, by the computing system, one or more actions associated with the one or more extra-organizational applications based at least in part on the one or more relationships; or
   communicating, by the computing system, with one or more entities associated with the one or more organizational records based at least in part on the one or more relationships.

16. The computer-implemented method of claim 11, wherein the application policy is based at least in part on an application specific query language that is configurable to generate one or more expressions that are used to access, modify, or control the organizational data or the plurality of applications.

17. The computer-implemented method of claim 11, wherein the one or more extra-organizational applications comprise one or more third-party applications or one or more third-party services associated with the one or more extra-organizational applications.

18. The computer-implemented method of claim 11, wherein the organizational data is owned and controlled by an organization, wherein the one or more extra-organizational applications are not owned or controlled by the organization, and wherein the one or more extra-organizational applications are at least partially owned or controlled by an entity that is not the organization.

19. The computer-implemented method of claim 11, further comprising:
   comparing, by the computing system, the one or more rules to one or more organizational policies associated with the organizational data; and
   determining, by the computing system, that the one or more rules that are not in compliance with the one or more organizational policies are not used to implement the application policy.

20. The computer-implemented method of claim 19, wherein the one or more rules and the one or more organizational policies are respectively associated with one or more authorization levels, and wherein the one or more rules that conflict with the one or more organizational policies and have a lower authorization level than the one or more organizational policies are determined not to be in compliance with the one or more organizational policies.

21. The computer-implemented method of claim 11, further comprising:
   receiving, by the computing system, one or more inputs via a graphical user interface configured to display one or more policy options associated with the application policy, wherein the one or more policy options comprise one or more conditions or one or more actions associated with the one or more extra-organizational applications; and
   generating, by the computing system, the application policy data based at least in part on the one or more user inputs.

22. A organizational management computing system comprising:
   one or more processors;
   one or more non-transitory computer-readable media storing instructions that when executed by the one or more processors cause the one or more processors to perform operations, the operations comprising:
   accessing organizational data having a graph comprising of a plurality of employee data objects, wherein the graph defines relationships among the employee data objects;
   receiving, over a communications network, first software application data from a first third-party software application of a plurality applications, wherein the first software application data is descriptive of an update to data stored in the first software third-party application;
   accessing application policy data associated with implementing an application policy, wherein the application policy data comprises one or more rules associated with implementing the application policy by using organizational data associated with the plurality of applications, wherein the application policy comprises a user-defined query, wherein the application policy associated with a second third party software application describes how the update to data stored in the first third-party software application causes an action to be performed to an account in the second third-party application, and wherein the plurality of applications comprises at least one of: (i) a time entry and management application, (ii) an instant messaging application among employees, (iii) an information technology management application, (iv) an accounting application, (v) a workflow management application, (vi) an email application, or (vii) an employee management application;
   determining, based at least in part on the application policy data and the graph, one or more organizational records of the organizational data that satisfy the one or more rules, wherein one or more of the organizational records is descriptive of an update to data stored in the first third-party application;
   accessing the plurality of applications associated with the one or more organizational records that satisfy the one or more rules;
   automatically performing, based at least in part on the application policy and the one or more organizational records, the one or more operations associated with implementing the application policy and the one or more satisfied rules, wherein the one or more operations includes executing the user-defined query relative to the graph to determine an employee object for which an action is to be taken in the second third-party application, the employee object being associated with the account; and
   communicating by the computer system over a communications network, to the second third-party application, automatically causing the action to be taken on the account associated with the determined employee object of the second third-party software application.

23. The computing system of claim 22, wherein a portion of the organizational data is based at least in part on remote data received from one or more remote computing devices associated with the plurality of applications.

24. The computing system of claim 22, wherein the one or more organizational records comprise one or more employee records associated with one or more employees of the organization.

\* \* \* \* \*